US011894550B2

(12) United States Patent
Whittingham et al.

(10) Patent No.: US 11,894,550 B2
(45) Date of Patent: Feb. 6, 2024

(54) $VOPO_4$ CATHODE FOR SODIUM ION BATTERIES

(71) Applicant: The Research Foundation for The State University of New York, Binghamton, NY (US)

(72) Inventors: M. Stanley Whittingham, Vestal, NY (US); Jia Ding, Binghamton, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 17/705,780

(22) Filed: Mar. 28, 2022

(65) Prior Publication Data

US 2022/0223846 A1 Jul. 14, 2022

Related U.S. Application Data

(62) Division of application No. 15/633,240, filed on Jun. 26, 2017, now Pat. No. 11,289,700.

(Continued)

(51) Int. Cl.
*H01M 4/38* (2006.01)
*H01M 10/054* (2010.01)
(Continued)

(52) U.S. Cl.
CPC .......... *H01M 4/381* (2013.01); *C01G 31/006* (2013.01); *C08K 3/04* (2013.01); *C08K 3/32* (2013.01);
(Continued)

(58) Field of Classification Search
None
See application file for complete search history.

(56) References Cited

U.S. PATENT DOCUMENTS 3,970,473 A 7/1976 Roth et al.
3,980,585 A 9/1976 Kerr et al.
(Continued)

OTHER PUBLICATIONS

He et al., β-NaVOPO4 Obtained by a Low-Temperature Synthesis Process: A New 3.3 V Cathode for Sodium-Ion Batteries, Chem. Mater. 2016,28, 5, 1503-1512. (Year: 2016).*
Hameed et al., Room Temperature large-scale synthesis of layered frameworks as low-cost 4 V cathode materials for lithium ion batteries, Scientific Reports 5, Article No. 16270 (2015). (Year: 2015).*

*Primary Examiner* — Carmen V Lyles-Irving
(74) *Attorney, Agent, or Firm* — Hoffberg & Associates; Steven M. Hoffberg

(57) ABSTRACT

An electrode comprising a space group $Pna2_1$ $VOPO_4$ lattice, capable of electrochemical insertion and release of alkali metal ions, e.g., sodium ions. The $VOPO_4$ lattice may be formed by solid phase synthesis of $KVOPO_4$, milled with carbon particles to increase conductivity. A method of forming an electrode is provided, comprising milling a mixture of ammonium metavanadate, ammonium phosphate monobasic, and potassium carbonate; heating the milled mixture to a reaction temperature, and holding the reaction temperature until a solid phase synthesis of $KVOPO_4$ occurs; milling the $KVOPO_4$ together with conductive particles to form a conductive mixture of fine particles; and adding binder material to form a conductive cathode. A sodium ion battery is provided having a conductive $NaVOPO_4$ cathode derived by replacement of potassium in $KVOPO_4$, a sodium ion donor anode, and a sodium ion transport electrolyte. The $VOPO_4$, preferably has a volume greater than 90 Å³ per $VOPO_4$.

16 Claims, 22 Drawing Sheets

Related U.S. Application Data

(60) Provisional application No. 62/355,639, filed on Jun. 28, 2016.

(51) Int. Cl.

| | | |
|---|---|---|
| *C01G 31/00* | (2006.01) | |
| *H01M 4/62* | (2006.01) | |
| *C08K 3/04* | (2006.01) | |
| *C08K 3/32* | (2006.01) | |
| *H01M 4/58* | (2010.01) | |
| *C09D 127/06* | (2006.01) | |
| *C08F 14/18* | (2006.01) | |
| *C08L 9/08* | (2006.01) | |
| *H01M 4/02* | (2006.01) | |

(52) U.S. Cl.
CPC ........ *C09D 127/06* (2013.01); *H01M 4/5825* (2013.01); *H01M 4/622* (2013.01); *H01M 4/623* (2013.01); *H01M 4/625* (2013.01); *H01M 10/054* (2013.01); *C01P 2002/72* (2013.01); *C08F 14/18* (2013.01); *C08K 2003/328* (2013.01); *C08L 9/08* (2013.01); *H01M 2004/028* (2013.01)

(56) References Cited

U.S. PATENT DOCUMENTS

| | | |
|---|---|---|
| 4,016,105 A | 4/1977 | Kerr |
| 4,049,574 A | 9/1977 | Kerr et al. |
| 4,056,487 A | 11/1977 | Kerr |
| 4,064,325 A | 12/1977 | Grenness |
| 4,071,539 A | 1/1978 | Kerr et al. |
| 4,097,345 A | 6/1978 | Shannon |
| 4,105,586 A | 8/1978 | Kerr |
| 4,117,208 A | 9/1978 | Ludwig |
| 4,123,388 A | 10/1978 | Kerr et al. |
| 4,152,338 A | 5/1979 | Kerr |
| 4,153,577 A | 5/1979 | Barone |
| 4,158,671 A | 6/1979 | Barone |
| 4,167,516 A | 9/1979 | Kerr |
| 4,179,404 A | 12/1979 | Barone |
| 4,202,826 A | 5/1980 | Kerr |
| 4,213,866 A | 7/1980 | Ashby et al. |
| 4,235,955 A | 11/1980 | Sammells et al. |
| 4,312,927 A | 1/1982 | Salmon |
| 4,355,162 A | 10/1982 | Johnson et al. |
| 4,376,709 A | 3/1983 | Johnson et al. |
| 4,382,876 A | 5/1983 | Neubold et al. |
| 4,410,752 A | 10/1983 | Blum et al. |
| 4,448,978 A | 5/1984 | Mount et al. |
| 4,459,406 A | 7/1984 | Johnson et al. |
| 4,472,527 A | 9/1984 | Otake et al. |
| 4,520,127 A | 5/1985 | Otake et al. |
| 4,562,269 A | 12/1985 | Moorehead |
| 4,564,603 A | 1/1986 | Robinson et al. |
| 4,567,314 A | 1/1986 | Robinson et al. |
| 4,599,477 A | 7/1986 | Robinson et al. |
| 4,604,371 A | 8/1986 | Moorehead |
| 4,632,812 A | 12/1986 | Kinneging et al. |
| 4,639,530 A | 1/1987 | Moorehead |
| 4,668,593 A | 5/1987 | Sammells |
| 4,677,084 A | 6/1987 | Bergna |
| 4,684,590 A | 8/1987 | Sammells |
| 4,722,877 A | 2/1988 | Sammells |
| 4,749,634 A | 6/1988 | Sammells |
| 4,769,477 A | 9/1988 | Bergna |
| 4,778,890 A | 10/1988 | Shimizu et al. |
| 4,801,567 A | 1/1989 | Moorehead |
| 4,849,539 A | 7/1989 | Bergna |
| 4,883,897 A | 11/1989 | Kiyomiya et al. |
| 4,886,584 A | 12/1989 | Cheng |
| 4,948,685 A | 8/1990 | Ohsawa et al. |
| 4,966,823 A | 10/1990 | Bugga et al. |
| 5,021,384 A | 6/1991 | Hatano et al. |
| 5,045,316 A | 9/1991 | Kaplan |
| 5,057,370 A | 10/1991 | Krieg et al. |
| 5,128,299 A | 7/1992 | Hatano et al. |
| 5,155,235 A | 10/1992 | Takashi et al. |
| 5,185,309 A | 2/1993 | Aono et al. |
| 5,220,049 A | 6/1993 | Honda et al. |
| 5,220,090 A | 6/1993 | Honda et al. |
| 5,239,115 A | 8/1993 | Matsuura |
| 5,252,752 A | 10/1993 | Aono et al. |
| 5,302,566 A | 4/1994 | Schwartz |
| 5,321,186 A | 6/1994 | Honda et al. |
| 5,329,043 A | 7/1994 | Matsuura et al. |
| 5,422,197 A | 6/1995 | Zito |
| 5,427,870 A | 6/1995 | Joshi et al. |
| 5,441,831 A | 8/1995 | Okamoto et al. |
| 5,443,601 A | 8/1995 | Doeff et al. |
| 5,498,731 A | 3/1996 | Tsurita et al. |
| 5,530,144 A | 6/1996 | Tsurita et al. |
| 5,532,385 A | 7/1996 | Benziger et al. |
| 5,563,006 A | 10/1996 | Von Benda et al. |
| 5,567,287 A | 10/1996 | Joshi et al. |
| 5,591,124 A | 1/1997 | Phipps |
| 5,622,530 A | 4/1997 | Phipps |
| 5,670,694 A | 9/1997 | Hagedorn et al. |
| 5,728,360 A | 3/1998 | Benziger et al. |
| 5,731,470 A | 3/1998 | Michl et al. |
| 5,849,434 A | 12/1998 | Miura et al. |
| 5,905,052 A | 5/1999 | Horowitz et al. |
| 6,004,309 A | 12/1999 | Phipps |
| 6,048,987 A | 4/2000 | Groke et al. |
| 6,059,943 A | 5/2000 | Murphy et al. |
| 6,136,472 A | 10/2000 | Barker et al. |
| 6,168,887 B1 | 1/2001 | Dahn et al. |
| 6,174,833 B1 | 1/2001 | Bertola et al. |
| 6,210,832 B1 | 4/2001 | Visco et al. |
| 6,287,448 B1 | 9/2001 | Schierle-Arndt et al. |
| 6,289,241 B1 | 9/2001 | Phipps |
| 6,313,323 B1 | 11/2001 | Werner et al. |
| 6,362,128 B1 | 3/2002 | Schwartz |
| 6,387,230 B1 | 5/2002 | Murphy et al. |
| 6,407,030 B1 | 6/2002 | Groke et al. |
| 6,444,815 B1 | 9/2002 | Nishiyama et al. |
| 6,495,486 B1 | 12/2002 | Kamiya et al. |
| 6,496,998 B2 | 12/2002 | Moran |
| 6,652,823 B2 | 11/2003 | Teunissen |
| 6,734,135 B1 | 5/2004 | Albonetti et al. |
| 6,746,791 B2 | 6/2004 | Yadav et al. |
| 6,762,146 B2 | 7/2004 | Kamiya et al. |
| 6,844,047 B2 | 1/2005 | Kaminsky et al. |
| 6,852,760 B1 | 2/2005 | Fine et al. |
| 6,866,755 B2 | 3/2005 | Monzyk et al. |
| 6,872,492 B2 | 3/2005 | Barker et al. |
| 6,878,668 B1 | 4/2005 | Schwartz et al. |
| 6,888,663 B2 | 5/2005 | Bourdelais et al. |
| 6,932,955 B2 | 8/2005 | Yamamoto et al. |
| 6,956,004 B2 | 10/2005 | Albonetti et al. |
| 6,958,860 B2 | 10/2005 | Dontula et al. |
| 7,041,239 B2 | 5/2006 | Barker et al. |
| 7,060,238 B2 | 6/2006 | Saidi et al. |
| 7,060,649 B2 | 6/2006 | Weiguny et al. |
| 7,122,027 B2 | 10/2006 | Trescony et al. |
| 7,144,652 B2 | 12/2006 | Alberti et al. |
| 7,157,403 B2 | 1/2007 | Weiguny et al. |
| 7,169,732 B2 | 1/2007 | Weiguny et al. |
| 7,213,984 B2 | 5/2007 | Kaneiwa et al. |
| 7,309,540 B2 | 12/2007 | Wang |
| 7,338,734 B2 | 3/2008 | Chiang et al. |
| 7,342,706 B2 | 3/2008 | Shinohara et al. |
| 7,383,083 B2 | 6/2008 | Fischer et al. |
| 7,419,314 B2 | 9/2008 | Kaneiwa et al. |
| 7,429,428 B2 | 9/2008 | Watakabe |
| 7,432,013 B2 | 10/2008 | Kishi et al. |
| 7,452,372 B2 | 11/2008 | Miller |
| 7,474,453 B2 | 1/2009 | Shinohara et al. |
| 7,485,261 B2 | 2/2009 | Monzyk et al. |
| 7,498,275 B2 | 3/2009 | Monzyk et al. |
| 7,572,925 B2 | 8/2009 | Dumesic et al. |
| 7,576,233 B2 | 8/2009 | Martin et al. |
| 7,632,604 B2 | 12/2009 | Iacovangelo et al. |

(56) References Cited

U.S. PATENT DOCUMENTS

| | | |
|---|---|---|
| 7,638,457 B2 | 12/2009 | Ghelfi et al. |
| 7,700,788 B2 | 4/2010 | Lilga et al. |
| 7,718,144 B2 | 5/2010 | Monzyk et al. |
| 7,719,227 B2 | 5/2010 | Lamoreux et al. |
| 7,741,559 B2 | 6/2010 | Kurihara et al. |
| 7,759,008 B2 | 7/2010 | Barker et al. |
| 7,771,628 B2 | 8/2010 | Barker et al. |
| 7,785,740 B2 | 8/2010 | Amine et al. |
| 7,790,319 B2 | 9/2010 | Faulkner |
| 7,825,250 B2 | 11/2010 | Kakuta et al. |
| 7,880,049 B2 | 2/2011 | Dumesic et al. |
| 7,901,810 B2 | 3/2011 | Barker et al. |
| 7,914,479 B2 | 3/2011 | Monzyk et al. |
| 7,939,201 B2 | 5/2011 | Chiang et al. |
| 7,951,186 B2 | 5/2011 | Eidenschink et al. |
| 7,955,733 B2 | 6/2011 | Armand et al. |
| 7,960,058 B2 | 6/2011 | Goodenough et al. |
| 7,964,308 B2 | 6/2011 | Goodenough et al. |
| 7,972,728 B2 | 7/2011 | Goodenough et al. |
| 7,986,124 B2 | 7/2011 | Stone et al. |
| 7,988,746 B2 | 8/2011 | Chiang et al. |
| 7,993,768 B2 | 8/2011 | Vallance et al. |
| 7,998,617 B2 | 8/2011 | Armand et al. |
| 8,003,250 B2 | 8/2011 | Chiang et al. |
| 8,034,457 B2 | 10/2011 | Wu et al. |
| 8,034,485 B2 | 10/2011 | Dahn et al. |
| 8,057,936 B2 | 11/2011 | Chiang et al. |
| 8,067,117 B2 | 11/2011 | Goodenough et al. |
| 8,088,512 B2 | 1/2012 | Gozdz et al. |
| 8,137,830 B2 | 3/2012 | Whitacre |
| 8,148,009 B2 | 4/2012 | Chiang et al. |
| 8,148,013 B2 | 4/2012 | Chiang et al. |
| 8,158,090 B2 | 4/2012 | Chiang et al. |
| 8,168,326 B2 | 5/2012 | Chiang et al. |
| 8,193,381 B2 | 6/2012 | Lilga et al. |
| 8,193,382 B2 | 6/2012 | Lilga et al. |
| 8,206,468 B2 | 6/2012 | Chiang et al. |
| 8,206,469 B2 | 6/2012 | Chiang et al. |
| 8,218,351 B2 | 7/2012 | Bloch et al. |
| 8,241,789 B2 | 8/2012 | Chiang et al. |
| 8,263,232 B2 | 9/2012 | Kimata et al. |
| 8,277,975 B2 | 10/2012 | Chiang et al. |
| 8,282,691 B2 | 10/2012 | Goodenough et al. |
| 8,298,701 B2 | 10/2012 | Whitacre et al. |
| 8,298,981 B2 | 10/2012 | Taufiq-Yap et al. |
| 8,318,046 B2 | 11/2012 | Hsu et al. |
| 8,318,353 B2 | 11/2012 | Faulkner |
| 8,323,817 B2 | 12/2012 | Gordon |
| 8,323,831 B2 | 12/2012 | Wilkins et al. |
| 8,323,832 B2 | 12/2012 | Chiang et al. |
| 8,324,376 B2 | 12/2012 | Binder et al. |
| 8,334,053 B2 | 12/2012 | Shapiro et al. |
| 8,343,661 B2 | 1/2013 | Galloway et al. |
| 8,354,189 B2 | 1/2013 | Pham et al. |
| 8,361,661 B2 | 1/2013 | Doe et al. |
| 8,409,476 B2 | 4/2013 | Hsu et al. |
| 8,420,258 B2 | 4/2013 | Rojeski |
| 8,435,673 B2 | 5/2013 | Lemmon et al. |
| 8,435,678 B2 | 5/2013 | Wixom et al. |
| 8,445,134 B2 | 5/2013 | Young |
| 8,445,135 B2 | 5/2013 | Sano et al. |
| 8,445,546 B2 | 5/2013 | Wood et al. |
| 8,449,756 B2 | 5/2013 | Monzyk et al. |
| 8,449,980 B2 | 5/2013 | Suzuki et al. |
| 8,481,208 B2 | 7/2013 | Riley, Jr. et al. |
| 8,492,031 B2 | 7/2013 | Suzuki et al. |
| 8,535,632 B2 | 9/2013 | Chase et al. |
| 8,551,654 B2 | 10/2013 | Young |
| 8,568,618 B2 | 10/2013 | Fichtner et al. |
| 8,574,762 B2 | 11/2013 | Dahn et al. |
| 8,580,422 B2 | 11/2013 | Whitacre et al. |
| 8,580,430 B2 | 11/2013 | Chiang et al. |
| 8,585,931 B2 | 11/2013 | Hsu et al. |
| 8,586,238 B2 | 11/2013 | Chiang et al. |
| 8,586,266 B2 | 11/2013 | Miyachi et al. |
| 8,592,097 B2 | 11/2013 | Wang |
| 8,617,430 B2 | 12/2013 | Chiang et al. |
| 8,617,745 B2 | 12/2013 | Gozdz et al. |
| 8,648,135 B2 | 2/2014 | Fujibayashi et al. |
| 8,652,431 B2 | 2/2014 | Patoux et al. |
| 8,652,672 B2 | 2/2014 | Whitacre et al. |
| 8,652,683 B2 | 2/2014 | Rojeski |
| 8,658,310 B2 | 2/2014 | Rojeski |
| 8,658,557 B2 | 2/2014 | Haddad et al. |
| 8,680,264 B2 | 3/2014 | Binder et al. |
| 8,685,550 B2 | 4/2014 | Kim et al. |
| 8,709,647 B2 | 4/2014 | Gozdz et al. |
| 8,722,227 B2 | 5/2014 | Chiang et al. |
| 8,722,242 B2 | 5/2014 | Muldoon et al. |
| 8,728,662 B2 | 5/2014 | Suguro et al. |
| 8,734,539 B2 | 5/2014 | Tokita et al. |
| 8,741,455 B2 | 6/2014 | Whitacre |
| 8,765,022 B2 | 7/2014 | Hsu et al. |
| 8,765,275 B2 | 7/2014 | Mahalingam et al. |
| 8,779,718 B2 | 7/2014 | Stone et al. |
| 8,784,692 B2 | 7/2014 | Hsu et al. |
| 8,784,897 B2 | 7/2014 | Archambeau et al. |
| 8,784,898 B2 | 7/2014 | Archambeau et al. |
| 8,785,043 B2 | 7/2014 | Armand et al. |
| 8,815,292 B2 | 8/2014 | Watson et al. |
| 8,821,763 B2 | 9/2014 | Sano et al. |
| 8,835,041 B2 | 9/2014 | Johnson et al. |
| 8,852,786 B2 | 10/2014 | Weaver et al. |
| 8,852,807 B2 | 10/2014 | Chiang et al. |
| 8,859,143 B2 | 10/2014 | Zhamu et al. |
| 8,906,542 B2 | 12/2014 | Johnson et al. |
| 8,911,904 B2 | 12/2014 | Parans Paranthaman et al. |
| 8,927,160 B2 | 1/2015 | Armand et al. |
| 8,932,509 B2 | 1/2015 | Miyachi et al. |
| 8,932,762 B2 | 1/2015 | Sano et al. |
| 8,936,871 B2 | 1/2015 | Sano et al. |
| 8,940,444 B2 | 1/2015 | Gennett et al. |
| 8,944,048 B2 | 2/2015 | Monzyk |
| 8,945,751 B2 | 2/2015 | Whitacre |
| 8,945,756 B2 | 2/2015 | Whitacre et al. |
| 8,951,665 B2 | 2/2015 | Keshavarz et al. |
| 8,951,673 B2 | 2/2015 | Wessells et al. |
| 8,951,676 B2 | 2/2015 | Doe et al. |
| 8,951,680 B2 | 2/2015 | Doe et al. |
| 8,956,760 B2 | 2/2015 | Lu et al. |
| 8,962,175 B2 | 2/2015 | Whitacre et al. |
| 8,988,047 B2 | 3/2015 | Bartling et al. |
| 8,993,171 B2 | 3/2015 | Sano et al. |
| 8,993,708 B2 | 3/2015 | Shibano et al. |
| 8,999,282 B2 | 4/2015 | Ceder et al. |
| 8,999,571 B2 | 4/2015 | Chiang et al. |
| 9,005,822 B2 | 4/2015 | Zhang et al. |
| 9,011,922 B2 | 4/2015 | Watson et al. |
| 9,012,091 B2 | 4/2015 | Wu et al. |
| 9,023,529 B2 | 5/2015 | Liu et al. |
| 9,029,015 B2 | 5/2015 | Pasta et al. |
| 9,054,394 B2 | 6/2015 | Sammells |
| 9,059,481 B2 | 6/2015 | He et al. |
| 9,065,093 B2 | 6/2015 | Chiang et al. |
| 9,077,032 B2 | 7/2015 | Doe et al. |
| 9,077,037 B2 | 7/2015 | Hwu et al. |
| 9,083,041 B2 | 7/2015 | Vail et al. |
| 9,088,046 B2 | 7/2015 | Whitacre |
| 9,099,718 B2 | 8/2015 | Lu et al. |
| 9,123,966 B2 | 9/2015 | Wessells et al. |
| 9,126,908 B2 | 9/2015 | Izuhara et al. |
| 9,130,234 B2 | 9/2015 | Wessells et al. |
| 9,166,214 B2 | 10/2015 | Stringer et al. |
| 9,200,165 B2 | 12/2015 | Imokawa et al. |
| 9,225,015 B2 | 12/2015 | Lee et al. |
| 9,246,164 B2 | 1/2016 | Lu et al. |
| 9,252,461 B2 | 2/2016 | Lu et al. |
| 9,272,000 B2 | 3/2016 | Watson et al. |
| 9,287,589 B2 | 3/2016 | Wessells et al. |
| 9,293,790 B2 | 3/2016 | Doe et al. |
| 9,299,966 B2 | 3/2016 | Chiang et al. |
| 9,300,000 B2 | 3/2016 | Jansen et al. |
| 9,305,716 B2 | 4/2016 | Tan et al. |
| 9,321,744 B1 | 4/2016 | Hsu et al. |

(56) References Cited

U.S. PATENT DOCUMENTS

| | | |
|---|---|---|
| 9,324,992 B2 | 4/2016 | Gennett et al. |
| 9,331,320 B2 | 5/2016 | Whitacre et al. |
| 9,331,333 B2 | 5/2016 | Senguttuvan et al. |
| 9,343,787 B2 | 5/2016 | Takechi et al. |
| 9,349,544 B2 | 5/2016 | Rojeski |
| 9,356,276 B2 | 5/2016 | Whitacre |
| 9,358,581 B2 | 6/2016 | Kaneko et al. |
| 9,362,537 B2 | 6/2016 | Zappi et al. |
| 9,362,562 B2 | 6/2016 | Armand et al. |
| 9,368,774 B2 | 6/2016 | Kumar et al. |
| 9,368,789 B2 | 6/2016 | Manthiram et al. |
| 9,379,368 B2 | 6/2016 | Roumi |
| 9,385,370 B2 | 7/2016 | Lu et al. |
| 9,391,319 B2 | 7/2016 | Shevchenko et al. |
| 9,413,036 B2 | 8/2016 | Bhavaraju et al. |
| 9,415,363 B2 | 8/2016 | Carey |
| 9,419,282 B2 | 8/2016 | Abouimrane et al. |
| 9,437,372 B1 | 9/2016 | Zhamu et al. |
| 9,450,224 B2 | 9/2016 | Lu et al. |
| 9,452,987 B2 | 9/2016 | Armand et al. |
| 9,478,794 B2 | 10/2016 | Wu et al. |
| 9,478,798 B2 | 10/2016 | Lu et al. |
| 9,512,331 B2 | 12/2016 | Imokawa et al. |
| 9,512,398 B2 | 12/2016 | Wood et al. |
| 9,515,318 B2 | 12/2016 | Paranthaman et al. |
| 9,531,003 B2 | 12/2016 | Lu et al. |
| 9,537,146 B2 | 1/2017 | Nose |
| 9,537,179 B2 | 1/2017 | Bhavaraju et al. |
| 9,553,326 B2 | 1/2017 | Izuhara et al. |
| 9,559,388 B2 | 1/2017 | Lee et al. |
| 9,564,656 B1 | 2/2017 | Zhamu et al. |
| 9,595,706 B2 | 3/2017 | Lu et al. |
| 9,608,269 B2 | 3/2017 | Barker |
| 9,620,783 B2 | 4/2017 | Parans Paranthaman et al. |
| 9,653,731 B2 | 5/2017 | Kendrick et al. |
| 9,660,253 B2 | 5/2017 | Nose |
| 9,660,263 B2 | 5/2017 | Kendrick et al. |
| 9,666,873 B2 | 5/2017 | Page |
| 9,666,899 B2 | 5/2017 | He et al. |
| 9,675,966 B2 | 6/2017 | Haddad et al. |
| 9,680,151 B2 | 6/2017 | Mullins et al. |
| 9,680,152 B2 | 6/2017 | Lu et al. |
| 9,680,154 B2 | 6/2017 | Chen et al. |
| 9,698,448 B2 | 7/2017 | Burrell et al. |
| 9,701,806 B2 | 7/2017 | Yasuda et al. |
| 9,711,793 B2 | 7/2017 | Mizuno et al. |
| 9,720,299 B1 | 8/2017 | Timmerman et al. |
| 9,722,247 B2 | 8/2017 | Zhang et al. |
| 9,722,277 B2 | 8/2017 | Xiao et al. |
| 9,722,279 B2 | 8/2017 | Mizuno et al. |
| 9,725,331 B2 | 8/2017 | Yao et al. |
| 9,725,381 B2 | 8/2017 | Hossain et al. |
| 9,728,775 B2 | 8/2017 | Whitacre et al. |
| 9,735,445 B2 | 8/2017 | Zhamu et al. |
| 9,739,544 B2 | 8/2017 | Matsui et al. |
| 9,745,205 B1 | 8/2017 | Yao et al. |
| 9,748,564 B2 | 8/2017 | Hart et al. |
| 9,748,600 B2 | 8/2017 | Tang et al. |
| 9,755,236 B2 | 9/2017 | Zhamu et al. |
| 9,755,241 B2 | 9/2017 | Zhamu et al. |
| 9,757,811 B2 | 9/2017 | Matsui et al. |
| 9,761,863 B2 | 9/2017 | Barker et al. |
| 9,774,035 B2 | 9/2017 | Barker et al. |
| 9,779,882 B2 | 10/2017 | Zhamu et al. |
| 9,780,349 B2 | 10/2017 | Zhamu et al. |
| 9,780,379 B2 | 10/2017 | Zhamu et al. |
| 9,786,910 B2 | 10/2017 | Johnson et al. |
| 9,786,944 B2 | 10/2017 | Chiang et al. |
| 9,799,881 B2 | 10/2017 | Sankarasubramanian et al. |
| 9,799,883 B2 | 10/2017 | Upreti |
| 9,815,752 B2 | 11/2017 | Hossain et al. |
| 9,819,220 B2 | 11/2017 | Mukherjee et al. |
| 9,831,502 B2 | 11/2017 | Zhou et al. |
| 9,847,184 B2 | 12/2017 | Zhamu et al. |
| 9,853,270 B2 | 12/2017 | Alkordi et al. |
| 9,853,318 B2 | 12/2017 | Wessells et al. |
| 9,859,583 B2 | 1/2018 | Delnick et al. |
| 9,865,900 B2 | 1/2018 | Xu et al. |
| 9,876,255 B2 | 1/2018 | Wessells et al. |
| 9,879,345 B2 | 1/2018 | Matsui et al. |
| 9,887,047 B2 | 2/2018 | Tan et al. |
| 9,890,048 B2 | 2/2018 | Goodenough et al. |
| 9,893,382 B2 | 2/2018 | Wessells et al. |
| 9,896,766 B2 | 2/2018 | Mizuno et al. |
| 9,899,672 B2 | 2/2018 | Zhamu et al. |
| 9,905,856 B1 | 2/2018 | Zhamu et al. |
| 9,914,677 B2 | 3/2018 | Hossain et al. |
| 9,917,307 B2 | 3/2018 | Barker et al. |
| 9,922,775 B2 | 3/2018 | Zhamu et al. |
| 9,928,968 B2 | 3/2018 | Bettinger et al. |
| 9,929,435 B2 | 3/2018 | Cai et al. |
| 9,935,314 B2 | 4/2018 | Johnson et al. |
| 9,954,213 B2 | 4/2018 | Roumi |
| 9,957,625 B2 | 5/2018 | Huber et al. |
| 9,960,397 B2 | 5/2018 | Whitacre et al. |
| 9,960,451 B1 | 5/2018 | Zhamu et al. |
| 9,966,199 B2 | 5/2018 | Zhamu et al. |
| 9,966,578 B2 | 5/2018 | Stringer et al. |
| 9,966,625 B2 | 5/2018 | Zhang et al. |
| 9,972,838 B2 | 5/2018 | Teran et al. |
| 9,972,863 B2 | 5/2018 | Teran et al. |
| 9,972,867 B2 | 5/2018 | Wessells et al. |
| 9,985,292 B2 | 5/2018 | Pratt et al. |
| 9,991,486 B2 | 6/2018 | Berger et al. |
| 9,997,777 B2 | 6/2018 | Prasad et al. |
| 2002/0058173 A1 | 5/2002 | Alberti et al. |
| 2002/0115562 A1 | 8/2002 | Teunissen |
| 2002/0141927 A1 | 10/2002 | Kamiya et al. |
| 2002/0177107 A1 | 11/2002 | Moran |
| 2002/0192553 A1 | 12/2002 | Barker et al. |
| 2003/0009127 A1 | 1/2003 | Trescony et al. |
| 2003/0031911 A1 | 2/2003 | Ritts et al. |
| 2003/0049511 A1 | 3/2003 | Ritts et al. |
| 2003/0054321 A1 | 3/2003 | Moran |
| 2003/0074062 A1 | 4/2003 | Monzyk et al. |
| 2003/0113606 A1 | 6/2003 | Ritts et al. |
| 2004/0005265 A1 | 1/2004 | Chiang et al. |
| 2004/0014990 A1 | 1/2004 | Storck et al. |
| 2004/0016632 A1 | 1/2004 | Barker |
| 2004/0048157 A1 | 3/2004 | Neudecker et al. |
| 2004/0066556 A1 | 4/2004 | Dontula et al. |
| 2004/0157122 A1 | 8/2004 | Naoi et al. |
| 2004/0162217 A1 | 8/2004 | Albonetti et al. |
| 2004/0197654 A1 | 10/2004 | Barker et al. |
| 2004/0243051 A1 | 12/2004 | Monzyk et al. |
| 2004/0258984 A1 | 12/2004 | Ariel et al. |
| 2004/0262571 A1* | 12/2004 | Barker ............... H01M 4/5825 |
| | | 429/231.95 |
| 2005/0025680 A1 | 2/2005 | Monzyk et al. |
| 2005/0029121 A1 | 2/2005 | Monzyk et al. |
| 2005/0040029 A1 | 2/2005 | Monzyk et al. |
| 2005/0072686 A1 | 4/2005 | Shaw et al. |
| 2005/0153834 A1 | 7/2005 | Weiguny et al. |
| 2005/0170256 A1 | 8/2005 | Cummings |
| 2005/0176984 A1 | 8/2005 | Martin et al. |
| 2005/0187144 A1 | 8/2005 | Fine et al. |
| 2005/0196334 A1 | 9/2005 | Saidi et al. |
| 2005/0222435 A1 | 10/2005 | Weiguny et al. |
| 2005/0222436 A1 | 10/2005 | Weiguny et al. |
| 2005/0227143 A1 | 10/2005 | Amine et al. |
| 2005/0231784 A1 | 10/2005 | Shinohara et al. |
| 2005/0233946 A1 | 10/2005 | Fine et al. |
| 2005/0233947 A1 | 10/2005 | Fine et al. |
| 2005/0238961 A1 | 10/2005 | Barker et al. |
| 2005/0259986 A1 | 11/2005 | Kaneiwa et al. |
| 2005/0260460 A1 | 11/2005 | Kishi et al. |
| 2005/0260473 A1 | 11/2005 | Wang |
| 2005/0266291 A1 | 12/2005 | Watakabe |
| 2005/0266300 A1 | 12/2005 | Lamoreux et al. |
| 2005/0282794 A1 | 12/2005 | Fine et al. |
| 2006/0003981 A1 | 1/2006 | Fine et al. |
| 2006/0110580 A1 | 5/2006 | Aylward et al. |
| 2006/0154126 A1 | 7/2006 | Ritts et al. |
| 2006/0173197 A1 | 8/2006 | Ghelfi et al. |

(56) References Cited

U.S. PATENT DOCUMENTS

| | | |
|---|---|---|
| 2006/0194112 A1 | 8/2006 | Barker et al. |
| 2006/0237059 A1 | 10/2006 | Kurihara et al. |
| 2006/0252686 A1 | 11/2006 | Fine et al. |
| 2006/0292444 A1 | 12/2006 | Chiang et al. |
| 2007/0031732 A1 | 2/2007 | Chiang et al. |
| 2007/0067018 A1 | 3/2007 | Miller |
| 2007/0072034 A1 | 3/2007 | Barker et al. |
| 2007/0092584 A1 | 4/2007 | Fine et al. |
| 2007/0141468 A1 | 6/2007 | Barker |
| 2007/0161540 A1 | 7/2007 | Fine et al. |
| 2007/0166617 A1 | 7/2007 | Gozdz et al. |
| 2007/0190418 A1 | 8/2007 | Chiang et al. |
| 2007/0196512 A1 | 8/2007 | Fine et al. |
| 2007/0197425 A1 | 8/2007 | Fine et al. |
| 2007/0207218 A1 | 9/2007 | Fine et al. |
| 2007/0247033 A1 | 10/2007 | Eidenschink et al. |
| 2007/0248520 A1 | 10/2007 | Faulkner |
| 2007/0281042 A1 | 12/2007 | Fine et al. |
| 2007/0292747 A1 | 12/2007 | Chiang et al. |
| 2007/0293566 A1 | 12/2007 | Fine et al. |
| 2007/0298317 A1 | 12/2007 | Brodd et al. |
| 2008/0017037 A1 | 1/2008 | Monzyk et al. |
| 2008/0027509 A1 | 1/2008 | Andino et al. |
| 2008/0044390 A1 | 2/2008 | Jin et al. |
| 2008/0145746 A1 | 6/2008 | Zappi et al. |
| 2008/0145755 A1 | 6/2008 | Iacovangelo et al. |
| 2008/0153002 A1 | 6/2008 | Nazar et al. |
| 2008/0181970 A1 | 7/2008 | Fine et al. |
| 2008/0213400 A1 | 9/2008 | Fine et al. |
| 2008/0227992 A1 | 9/2008 | Dobner et al. |
| 2008/0261113 A1 | 10/2008 | Huang et al. |
| 2008/0299439 A1 | 12/2008 | Wang |
| 2009/0005824 A1 | 1/2009 | Visco et al. |
| 2009/0011331 A1 | 1/2009 | Stringer et al. |
| 2009/0061267 A1 | 3/2009 | Monzyk et al. |
| 2009/0069740 A1 | 3/2009 | Visco et al. |
| 2009/0074611 A1 | 3/2009 | Monzyk et al. |
| 2009/0081518 A1 | 3/2009 | Miyachi et al. |
| 2009/0110998 A1 | 4/2009 | Miyachi et al. |
| 2009/0111022 A1 | 4/2009 | Dahn et al. |
| 2009/0130517 A1 | 5/2009 | Miyachi et al. |
| 2009/0130525 A1 | 5/2009 | Miyachi et al. |
| 2009/0162736 A1 | 6/2009 | Vallance et al. |
| 2009/0165803 A1 | 7/2009 | Bhat et al. |
| 2009/0173352 A1 | 7/2009 | Bhat et al. |
| 2009/0189567 A1 | 7/2009 | Joshi et al. |
| 2009/0202859 A1 | 8/2009 | Kimata et al. |
| 2009/0205973 A1 | 8/2009 | Monzyk et al. |
| 2009/0208807 A1 | 8/2009 | Miyachi et al. |
| 2009/0214944 A1 | 8/2009 | Rojeski |
| 2009/0220838 A9 | 9/2009 | Barker et al. |
| 2009/0233170 A1 | 9/2009 | Iacovangelo et al. |
| 2009/0246636 A1 | 10/2009 | Chiang et al. |
| 2009/0253025 A1 | 10/2009 | Whitacre |
| 2009/0291365 A1 | 11/2009 | Iacovangelo et al. |
| 2009/0297948 A1 | 12/2009 | Dahn et al. |
| 2009/0311597 A1 | 12/2009 | Chiang et al. |
| 2010/0009008 A1 | 1/2010 | Watson et al. |
| 2010/0028784 A1 | 2/2010 | Pham et al. |
| 2010/0068629 A1 | 3/2010 | Gordon |
| 2010/0075225 A1 | 3/2010 | Wilkins et al. |
| 2010/0075226 A1 | 3/2010 | Pham et al. |
| 2010/0078591 A1 | 4/2010 | Sano et al. |
| 2010/0086823 A1 | 4/2010 | Koshino et al. |
| 2010/0086834 A1 | 4/2010 | Mahalingam et al. |
| 2010/0119847 A1 | 5/2010 | Wu et al. |
| 2010/0174343 A1 | 7/2010 | Andino et al. |
| 2010/0178532 A1 | 7/2010 | Shapiro et al. |
| 2010/0224502 A1 | 9/2010 | Carey |
| 2010/0233545 A1 | 9/2010 | Sano et al. |
| 2010/0239946 A1 | 9/2010 | Miyachi et al. |
| 2010/0255372 A1 | 10/2010 | Suguro et al. |
| 2010/0261070 A1 | 10/2010 | Keshavarz et al. |
| 2010/0266899 A1 | 10/2010 | Barker et al. |
| 2010/0279165 A1 | 11/2010 | Lemmon et al. |
| 2010/0279174 A1 | 11/2010 | Young |
| 2010/0279175 A1 | 11/2010 | Young |
| 2010/0297193 A1 | 11/2010 | Archambeau et al. |
| 2010/0303701 A1 | 12/2010 | Faulkner |
| 2010/0303871 A1 | 12/2010 | Watson et al. |
| 2010/0303917 A1 | 12/2010 | Watson et al. |
| 2010/0303918 A1 | 12/2010 | Watson et al. |
| 2010/0310664 A1 | 12/2010 | Watson et al. |
| 2010/0310665 A1 | 12/2010 | Watson et al. |
| 2010/0311167 A1 | 12/2010 | Wood et al. |
| 2010/0311574 A1 | 12/2010 | Taufiq-Yap et al. |
| 2010/0316723 A1 | 12/2010 | Watson et al. |
| 2011/0017209 A1 | 1/2011 | Monzyk |
| 2011/0038760 A1 | 2/2011 | Monzyk et al. |
| 2011/0052467 A1 | 3/2011 | Chase et al. |
| 2011/0052473 A1 | 3/2011 | Sano et al. |
| 2011/0052986 A1 | 3/2011 | Barker et al. |
| 2011/0052995 A1 | 3/2011 | Sano et al. |
| 2011/0081384 A1 | 4/2011 | Archambeau et al. |
| 2011/0104570 A1 | 5/2011 | Galloway et al. |
| 2011/0127967 A1 | 6/2011 | Soloveichik et al. |
| 2011/0151289 A1 | 6/2011 | Vallance et al. |
| 2011/0159381 A1 | 6/2011 | Doe et al. |
| 2011/0195306 A1 | 8/2011 | Chiang et al. |
| 2011/0200848 A1 | 8/2011 | Chiang et al. |
| 2011/0223475 A1 | 9/2011 | Porob et al. |
| 2011/0229765 A1 | 9/2011 | Barker et al. |
| 2011/0236743 A1 | 9/2011 | Kumar et al. |
| 2011/0244303 A1 | 10/2011 | Rahmane et al. |
| 2011/0254560 A1 | 10/2011 | Stone et al. |
| 2011/0274948 A1 | 11/2011 | Duduta et al. |
| 2011/0311846 A1 | 12/2011 | Whitacre |
| 2011/0311884 A1 | 12/2011 | Armand et al. |
| 2012/0003533 A1 | 1/2012 | Dahn et al. |
| 2012/0032118 A1 | 2/2012 | Fichtner et al. |
| 2012/0040245 A1 | 2/2012 | Dahn et al. |
| 2012/0095179 A1 | 4/2012 | Nishide et al. |
| 2012/0114957 A1 | 5/2012 | Fujibayashi et al. |
| 2012/0140378 A1 | 6/2012 | Tan et al. |
| 2012/0149919 A1 | 6/2012 | Altwasser et al. |
| 2012/0164499 A1 | 6/2012 | Chiang et al. |
| 2012/0164510 A1 | 6/2012 | Weaver et al. |
| 2012/0171574 A1 | 7/2012 | Zhamu et al. |
| 2012/0183837 A1 | 7/2012 | Johnson et al. |
| 2012/0214071 A1 | 8/2012 | Chiang et al. |
| 2012/0219856 A1 | 8/2012 | Doe et al. |
| 2012/0219859 A1 | 8/2012 | Doe et al. |
| 2012/0237828 A1 | 9/2012 | Tan et al. |
| 2012/0270109 A1 | 10/2012 | Chiang et al. |
| 2012/0279850 A1 | 11/2012 | Patoux et al. |
| 2012/0289887 A1 | 11/2012 | Visco et al. |
| 2012/0295147 A1 | 11/2012 | Liu et al. |
| 2012/0302697 A1 | 11/2012 | Inada et al. |
| 2012/0315538 A1 | 12/2012 | Chiang et al. |
| 2012/0328936 A1 | 12/2012 | Wessells et al. |
| 2013/0004828 A1 | 1/2013 | Zappi et al. |
| 2013/0022873 A1 | 1/2013 | von Bulow et al. |
| 2013/0034780 A1 | 2/2013 | Muldoon et al. |
| 2013/0040171 A1 | 2/2013 | Galloway |
| 2013/0052492 A1 | 2/2013 | Schaefer |
| 2013/0052538 A1 | 2/2013 | Pasta et al. |
| 2013/0059211 A1 | 3/2013 | Schaefer et al. |
| 2013/0078523 A1 | 3/2013 | Rojeski |
| 2013/0078524 A1 | 3/2013 | Rojeski |
| 2013/0084453 A1 | 4/2013 | Imokawa et al. |
| 2013/0084474 A1 | 4/2013 | Mills |
| 2013/0089486 A1 | 4/2013 | Ceder et al. |
| 2013/0092532 A1 | 4/2013 | Monzyk et al. |
| 2013/0102455 A1 | 4/2013 | Haddad et al. |
| 2013/0115521 A1 | 5/2013 | Doe et al. |
| 2013/0171468 A1 | 7/2013 | Imokawa et al. |
| 2013/0189571 A1 | 7/2013 | Abouimrane et al. |
| 2013/0196224 A1 | 8/2013 | Kim et al. |
| 2013/0209897 A1 | 8/2013 | Paranthaman et al. |
| 2013/0224538 A1 | 8/2013 | Jansen et al. |
| 2013/0224632 A1 | 8/2013 | Roumi |
| 2013/0244100 A1 | 9/2013 | Tan et al. |
| 2013/0252082 A1 | 9/2013 | Thompkins et al. |
| 2013/0252112 A1 | 9/2013 | Doe et al. |

(56) References Cited

U.S. PATENT DOCUMENTS

| | | |
|---|---|---|
| 2013/0252114 A1 | 9/2013 | Doe et al. |
| 2013/0257378 A1 | 10/2013 | Lu et al. |
| 2013/0260021 A1 | 10/2013 | Lu et al. |
| 2013/0260228 A1 | 10/2013 | Sano et al. |
| 2013/0260260 A1 | 10/2013 | Lu et al. |
| 2013/0260462 A1 | 10/2013 | Wood et al. |
| 2013/0273389 A1 | 10/2013 | Kaneko et al. |
| 2013/0280611 A1 | 10/2013 | Alkordi et al. |
| 2013/0298386 A1 | 11/2013 | Tarascon et al. |
| 2013/0302697 A1 | 11/2013 | Wang et al. |
| 2013/0309544 A1 | 11/2013 | Zappi et al. |
| 2013/0316228 A1 | 11/2013 | Moc et al. |
| 2013/0316250 A1 | 11/2013 | Khalifah et al. |
| 2013/0330634 A1 | 12/2013 | Huber et al. |
| 2013/0344367 A1 | 12/2013 | Chiang et al. |
| 2014/0023903 A1 | 1/2014 | Lu et al. |
| 2014/0030577 A1 | 1/2014 | Huber et al. |
| 2014/0038044 A1 | 2/2014 | Vail et al. |
| 2014/0045096 A1 | 2/2014 | Berger et al. |
| 2014/0050982 A1 | 2/2014 | Lu et al. |
| 2014/0062412 A1 | 3/2014 | Bartling et al. |
| 2014/0065456 A1 | 3/2014 | Bhavaraju et al. |
| 2014/0065465 A1 | 3/2014 | Johnson et al. |
| 2014/0072836 A1 | 3/2014 | Mills |
| 2014/0099557 A1 | 4/2014 | Doe et al. |
| 2014/0099560 A1 | 4/2014 | Parans Paranthaman et al. |
| 2014/0127560 A1 | 5/2014 | Wessells et al. |
| 2014/0127591 A1 | 5/2014 | Wessells et al. |
| 2014/0127592 A1 | 5/2014 | Wessells et al. |
| 2014/0147752 A1 | 5/2014 | Pratt et al. |
| 2014/0170476 A1 | 6/2014 | Tan et al. |
| 2014/0178735 A1 | 6/2014 | Wang et al. |
| 2014/0186719 A1 | 7/2014 | Wang et al. |
| 2014/0199596 A1 | 7/2014 | Shao et al. |
| 2014/0212733 A1 | 7/2014 | Johnson et al. |
| 2014/0212755 A1 | 7/2014 | Wu et al. |
| 2014/0213671 A1 | 7/2014 | Izuhara et al. |
| 2014/0220450 A1 | 8/2014 | Jilek et al. |
| 2014/0223740 A1 | 8/2014 | Matsui et al. |
| 2014/0234544 A1 | 8/2014 | Takada et al. |
| 2014/0239905 A1 | 8/2014 | Yamazaki |
| 2014/0242445 A1 | 8/2014 | Gozdz et al. |
| 2014/0248539 A1 | 9/2014 | Liu |
| 2014/0255793 A1 | 9/2014 | Zhang et al. |
| 2014/0272592 A1 | 9/2014 | Thompkins et al. |
| 2014/0302403 A1 | 10/2014 | Doe et al. |
| 2014/0308544 A1 | 10/2014 | Wessells et al. |
| 2014/0308583 A1 | 10/2014 | Manthiram et al. |
| 2014/0322567 A1 | 10/2014 | Stone et al. |
| 2014/0335407 A1 | 11/2014 | Yao et al. |
| 2014/0342240 A1 | 11/2014 | Harrup et al. |
| 2014/0363635 A1 | 12/2014 | Upreti |
| 2014/0370388 A1 | 12/2014 | Singh et al. |
| 2014/0370405 A1 | 12/2014 | Zhang et al. |
| 2015/0002098 A1 | 1/2015 | Sammells |
| 2015/0013947 A1 | 1/2015 | Matsui et al. |
| 2015/0017322 A1 | 1/2015 | Reynaud et al. |
| 2015/0017544 A1 | 1/2015 | Prasad et al. |
| 2015/0024010 A1 | 1/2015 | Archambeau et al. |
| 2015/0027342 A1 | 1/2015 | Matsui et al. |
| 2015/0030896 A1 | 1/2015 | Bhavaraju et al. |
| 2015/0030929 A1 | 1/2015 | Barker |
| 2015/0037679 A1 | 2/2015 | Barker et al. |
| 2015/0050343 A1 | 2/2015 | Archambeau et al. |
| 2015/0050346 A1 | 2/2015 | Watson et al. |
| 2015/0064574 A1 | 3/2015 | He et al. |
| 2015/0064580 A1 | 3/2015 | Bridges et al. |
| 2015/0069307 A1 | 3/2015 | Parans Paranthaman et al. |
| 2015/0086826 A1 | 3/2015 | Bhavaraju et al. |
| 2015/0086860 A1 | 3/2015 | Yokoi et al. |
| 2015/0099150 A1 | 4/2015 | Lee et al. |
| 2015/0099199 A1 | 4/2015 | Bazant et al. |
| 2015/0102257 A1 | 4/2015 | Mullins et al. |
| 2015/0111105 A1 | 4/2015 | Kato et al. |
| 2015/0132650 A1 | 5/2015 | Mizuno et al. |
| 2015/0137031 A1 | 5/2015 | Barker et al. |
| 2015/0140422 A1 | 5/2015 | Liu et al. |
| 2015/0140449 A1 | 5/2015 | Ishikawa et al. |
| 2015/0147642 A1 | 5/2015 | Ling et al. |
| 2015/0171419 A1 | 6/2015 | Shevchenko et al. |
| 2015/0194672 A1 | 7/2015 | Barker et al. |
| 2015/0207138 A1 | 7/2015 | Barker et al. |
| 2015/0214539 A1 | 7/2015 | Barker et al. |
| 2015/0228964 A1 | 8/2015 | Wu et al. |
| 2015/0232634 A1 | 8/2015 | Yasuda et al. |
| 2015/0236342 A1 | 8/2015 | Rojeski |
| 2015/0236349 A1 | 8/2015 | Chiang et al. |
| 2015/0243983 A1 | 8/2015 | Barker et al. |
| 2015/0255803 A1 | 9/2015 | Delnick et al. |
| 2015/0263382 A1 | 9/2015 | Singh et al. |
| 2015/0287991 A1 | 10/2015 | Lu et al. |
| 2015/0295236 A1 | 10/2015 | Senguttuvan et al. |
| 2015/0303474 A1 | 10/2015 | Barker et al. |
| 2015/0311506 A1 | 10/2015 | Mizuno et al. |
| 2015/0311516 A1 | 10/2015 | Chen et al. |
| 2015/0311520 A1 | 10/2015 | Mizuno et al. |
| 2015/0311565 A1 | 10/2015 | Muldoon et al. |
| 2015/0315155 A1 | 11/2015 | Armand et al. |
| 2015/0357630 A1 | 12/2015 | Lu et al. |
| 2015/0364753 A1 | 12/2015 | Chiang et al. |
| 2015/0380696 A1 | 12/2015 | Stringer et al. |
| 2015/0380759 A1 | 12/2015 | Izuhara et al. |
| 2016/0006028 A1 | 1/2016 | Nair et al. |
| 2016/0013470 A1 | 1/2016 | Paulsen et al. |
| 2016/0015738 A1 | 1/2016 | Watson et al. |
| 2016/0028105 A1 | 1/2016 | Khalifah et al. |
| 2016/0028114 A1 | 1/2016 | Pratt et al. |
| 2016/0028122 A1 | 1/2016 | Zhamu et al. |
| 2016/0032471 A1 | 2/2016 | Magnan et al. |
| 2016/0036107 A1 | 2/2016 | Takechi et al. |
| 2016/0040298 A1 | 2/2016 | Mizuno et al. |
| 2016/0045841 A1 | 2/2016 | Kaplan et al. |
| 2016/0049262 A1 | 2/2016 | Bettinger et al. |
| 2016/0056448 A1 | 2/2016 | Chadha et al. |
| 2016/0060765 A1 | 3/2016 | Mizuno et al. |
| 2016/0072128 A1 | 3/2016 | Pasta et al. |
| 2016/0087260 A1 | 3/2016 | Lu et al. |
| 2016/0096334 A1 | 4/2016 | Sander et al. |
| 2016/0104890 A1 | 4/2016 | Hart et al. |
| 2016/0111720 A1 | 4/2016 | Arthur et al. |
| 2016/0126575 A1 | 5/2016 | Chao et al. |
| 2016/0126589 A1 | 5/2016 | Xiao et al. |
| 2016/0133394 A1 | 5/2016 | Sakshaug et al. |
| 2016/0133925 A1 | 5/2016 | Tenne et al. |
| 2016/0141611 A1 | 5/2016 | Monconduit et al. |
| 2016/0149211 A1 | 5/2016 | Hart et al. |
| 2016/0156023 A1 | 6/2016 | Wessells et al. |
| 2016/0164152 A1 | 6/2016 | Tan et al. |
| 2016/0181596 A1 | 6/2016 | Singh et al. |
| 2016/0181607 A1 | 6/2016 | Kendrick et al. |
| 2016/0181608 A1 | 6/2016 | Kendrick et al. |
| 2016/0186334 A1 | 6/2016 | Murahara |
| 2016/0190588 A1 | 6/2016 | Wessells et al. |
| 2016/0190629 A1 | 6/2016 | Wessells et al. |
| 2016/0190636 A1 | 6/2016 | Mizuno et al. |
| 2016/0201197 A1 | 7/2016 | Monzyk et al. |
| 2016/0204436 A1 | 7/2016 | Barker et al. |
| 2016/0218363 A1 | 7/2016 | Meng et al. |
| 2016/0226072 A1 | 8/2016 | Surendranath et al. |
| 2016/0233551 A1 | 8/2016 | Wessells et al. |
| 2016/0240840 A1 | 8/2016 | He et al. |
| 2016/0240841 A1 | 8/2016 | He et al. |
| 2016/0254514 A1 | 9/2016 | Roumi |
| 2016/0254538 A1 | 9/2016 | Manthiram et al. |
| 2016/0254567 A1 | 9/2016 | Cai et al. |
| 2016/0265085 A1 | 9/2016 | Bourassa et al. |
| 2016/0285089 A1 | 9/2016 | Mitlin |
| 2016/0285098 A1 | 9/2016 | Lu et al. |
| 2016/0289852 A1 | 10/2016 | Cui et al. |
| 2016/0293954 A1 | 10/2016 | Zhamu et al. |
| 2016/0294000 A1 | 10/2016 | He et al. |
| 2016/0301075 A1 | 10/2016 | Zhamu et al. |
| 2016/0301078 A1 | 10/2016 | Zhamu et al. |
| 2016/0301096 A1 | 10/2016 | Zhamu et al. |

(56) References Cited

U.S. PATENT DOCUMENTS

| | | |
|---|---|---|
| 2016/0301097 A1 | 10/2016 | Li et al. |
| 2016/0301102 A1 | 10/2016 | Zhamu et al. |
| 2016/0315329 A1 | 10/2016 | Sankarasubramanian et al. |
| 2016/0318760 A1 | 11/2016 | Carey |
| 2016/0322662 A1 | 11/2016 | Schmitz et al. |
| 2016/0329564 A1 | 11/2016 | Barker et al. |
| 2016/0336588 A1 | 11/2016 | Lu et al. |
| 2016/0344010 A1 | 11/2016 | Zhamu et al. |
| 2016/0344030 A1 | 11/2016 | Sakshaug et al. |
| 2016/0344035 A1 | 11/2016 | Zhamu et al. |
| 2016/0351904 A1 | 12/2016 | Goodenough et al. |
| 2016/0365577 A1 | 12/2016 | Zhang et al. |
| 2016/0365578 A1 | 12/2016 | Kendrick et al. |
| 2016/0368777 A1 | 12/2016 | Goodenough et al. |
| 2016/0379764 A1 | 12/2016 | Tour et al. |
| 2017/0008821 A1 | 1/2017 | Hossain et al. |
| 2017/0014812 A1 | 1/2017 | Haddad et al. |
| 2017/0025646 A1 | 1/2017 | Ota et al. |
| 2017/0025678 A1 | 1/2017 | Gruar et al. |
| 2017/0027168 A1 | 2/2017 | Heath |
| 2017/0029962 A1 | 2/2017 | Manikoth et al. |
| 2017/0037207 A1 | 2/2017 | Kunita et al. |
| 2017/0069931 A1 | 3/2017 | Wang et al. |
| 2017/0077500 A1 | 3/2017 | Yu et al. |
| 2017/0077546 A1 | 3/2017 | Zhamu et al. |
| 2017/0092947 A1 | 3/2017 | Kendrick et al. |
| 2017/0098848 A1 | 4/2017 | Sammells |
| 2017/0103856 A1 | 4/2017 | Zhamu et al. |
| 2017/0104204 A1 | 4/2017 | Zhamu et al. |
| 2017/0104363 A1 | 4/2017 | Mukherjee et al. |
| 2017/0110259 A1 | 4/2017 | Mitlin et al. |
| 2017/0110728 A1 | 4/2017 | Kobayashi et al. |
| 2017/0140881 A1 | 5/2017 | Mitlin et al. |
| 2017/0148573 A1 | 5/2017 | Zhamu et al. |
| 2017/0155150 A1 | 6/2017 | Barker et al. |
| 2017/0162875 A1 | 6/2017 | Tolbert et al. |
| 2017/0170460 A1 | 6/2017 | Angeliu et al. |
| 2017/0173262 A1 | 6/2017 | Veltz |
| 2017/0174527 A1 | 6/2017 | Barker et al. |
| 2017/0183435 A1 | 6/2017 | Ino et al. |
| 2017/0190595 A1 | 7/2017 | Sayers et al. |
| 2017/0194665 A9 | 7/2017 | Zhamu et al. |
| 2017/0200565 A1 | 7/2017 | Zhamu et al. |
| 2017/0207458 A1 | 7/2017 | Thomas-Alyea et al. |
| 2017/0207484 A1 | 7/2017 | Zhamu et al. |
| 2017/0207488 A1 | 7/2017 | Zhamu et al. |
| 2017/0207489 A1 | 7/2017 | Zhamu et al. |
| 2017/0214095 A1 | 7/2017 | Mukherjee et al. |
| 2017/0221643 A1 | 8/2017 | Zhamu et al. |
| 2017/0222224 A1 | 8/2017 | Kendrick et al. |
| 2017/0222279 A1 | 8/2017 | Schumann et al. |
| 2017/0233312 A1 | 8/2017 | Hossain et al. |
| 2017/0237118 A1 | 8/2017 | Khalifah et al. |
| 2017/0244098 A1 | 8/2017 | Duong et al. |
| 2017/0244102 A1 | 8/2017 | Chen et al. |
| 2017/0271670 A1 | 9/2017 | Obrovac et al. |
| 2017/0294654 A1 | 10/2017 | Siegal et al. |
| 2017/0297978 A1 | 10/2017 | Hossain et al. |
| 2017/0303405 A1 | 10/2017 | Fukuchi |
| 2017/0309943 A1 | 10/2017 | Angell et al. |
| 2017/0317350 A1 | 11/2017 | Ceder et al. |
| 2017/0317388 A1 | 11/2017 | Zhamu et al. |
| 2017/0329196 A1 | 11/2017 | Timmerman et al. |
| 2017/0338472 A1 | 11/2017 | Zhamu et al. |
| 2017/0341942 A1 | 11/2017 | Harper, Jr. |
| 2017/0345581 A1 | 11/2017 | Kim et al. |
| 2017/0346084 A1 | 11/2017 | Sakshaug et al. |
| 2017/0352868 A1 | 12/2017 | Zhamu et al. |
| 2017/0352869 A1 | 12/2017 | Zhamu et al. |
| 2017/0352870 A1 | 12/2017 | Alcoutlabi et al. |
| 2017/0373297 A1 | 12/2017 | Zhamu et al. |
| 2017/0373305 A1 | 12/2017 | Adamson et al. |
| 2017/0373306 A1 | 12/2017 | Adamson et al. |
| 2017/0373310 A1 | 12/2017 | Whittingham et al. |
| 2017/0373317 A1 | 12/2017 | Upreti |
| 2017/0373322 A1 | 12/2017 | Zhamu et al. |
| 2018/0006336 A1 | 1/2018 | Odom et al. |
| 2018/0013170 A1 | 1/2018 | Goodenough et al. |
| 2018/0019070 A1 | 1/2018 | Chai et al. |
| 2018/0019072 A1 | 1/2018 | Zhamu et al. |
| 2018/0026297 A1 | 1/2018 | Odom et al. |
| 2018/0026317 A1 | 1/2018 | Johnson et al. |
| 2018/0034048 A1 | 2/2018 | Teran et al. |
| 2018/0034054 A1 | 2/2018 | Chan et al. |
| 2018/0034061 A1 | 2/2018 | Teran et al. |
| 2018/0034090 A1 | 2/2018 | Chiang et al. |
| 2018/0034096 A1 | 2/2018 | Teran et al. |
| 2018/0040887 A1 | 2/2018 | Palani et al. |
| 2018/0047984 A1 | 2/2018 | Kang et al. |
| 2018/0053959 A1 | 2/2018 | Delnick et al. |
| 2018/0053968 A1 | 2/2018 | Sava Gallis et al. |
| 2018/0062176 A1 | 3/2018 | Liao et al. |
| 2018/0076456 A1 | 3/2018 | Lefevre et al. |
| 2018/0083266 A1 | 3/2018 | Zhamu et al. |
| 2018/0083282 A1 | 3/2018 | Baba et al. |
| 2018/0083289 A1 | 3/2018 | Zhamu et al. |
| 2018/0097220 A1 | 4/2018 | Lefevre et al. |
| 2018/0097257 A1 | 4/2018 | Sousa Soares De Oliveira Braga et al. |
| 2018/0102569 A1 | 4/2018 | Goodenough et al. |
| 2018/0102671 A1 | 4/2018 | Mukherjee et al. |
| 2018/0108905 A1 | 4/2018 | Palmore et al. |
| 2018/0115014 A1 | 4/2018 | Zanotti et al. |
| 2018/0123164 A1 | 5/2018 | Han et al. |
| 2018/0127280 A1 | 5/2018 | Goodenough et al. |
| 2018/0134910 A1 | 5/2018 | Umeda et al. |
| 2018/0135149 A1 | 5/2018 | Oriji et al. |
| 2018/0138554 A1 | 5/2018 | Mukherjee et al. |
| 2018/0145328 A1 | 5/2018 | Mullins et al. |
| 2018/0148355 A1 | 5/2018 | Smith et al. |
| 2018/0151916 A1 | 5/2018 | Howlett et al. |
| 2018/0159106 A1 | 6/2018 | McVerry et al. |
| 2018/0159123 A1 | 6/2018 | Mizuno et al. |
| 2018/0166686 A1 | 6/2018 | Kumakura et al. |
| 2018/0166748 A1 | 6/2018 | Gourishankar et al. |
| 2018/0166759 A1 | 6/2018 | Zhamu et al. |
| 2018/0171164 A1 | 6/2018 | Fujita et al. |
| 2018/0174766 A1 | 6/2018 | Zhamu et al. |
| 2018/0175433 A1 | 6/2018 | Zhamu et al. |
| 2018/0175434 A1 | 6/2018 | Zhamu et al. |
| 2018/0175470 A1 | 6/2018 | Bai et al. |
| 2018/0182564 A1 | 6/2018 | Mitlin et al. |
| 2018/0183024 A1 | 6/2018 | Zhamu et al. |
| 2018/0183052 A1 | 6/2018 | Zhamu et al. |
| 2018/0183060 A1 | 6/2018 | Spahr et al. |
| 2018/0183062 A1 | 6/2018 | Zhamu et al. |
| 2018/0183066 A1 | 6/2018 | Zhamu et al. |
| 2018/0183067 A1 | 6/2018 | Zhamu et al. |
| 2018/0183107 A1 | 6/2018 | Zhamu et al. |
| 2018/0190439 A1 | 7/2018 | Zhamu et al. |
| 2018/0190959 A1 | 7/2018 | Alkordi et al. |
| 2018/0191033 A1 | 7/2018 | Wessells et al. |
| 2018/0198168 A1 | 7/2018 | Zhamu et al. |
| 2018/0198290 A1 | 7/2018 | Rohera |
| 2018/0201524 A1 | 7/2018 | Choi et al. |
| 2018/0205078 A1 | 7/2018 | Kendrick et al. |
| 2018/0205081 A1 | 7/2018 | Yoshida et al. |
| 2018/0219248 A1 | 8/2018 | Kendrick et al. |
| 2018/0226831 A9 | 8/2018 | Mukherjee et al. |
| 2018/0233297 A1 | 8/2018 | Zhamu et al. |
| 2018/0233784 A1 | 8/2018 | Zhamu et al. |
| 2018/0241031 A1 | 8/2018 | Pan et al. |
| 2018/0241042 A1 | 8/2018 | Cho et al. |
| 2018/0241079 A1 | 8/2018 | Duong et al. |
| 2018/0248185 A1 | 8/2018 | Johnson et al. |
| 2018/0248218 A1 | 8/2018 | Zhang et al. |

\* cited by examiner

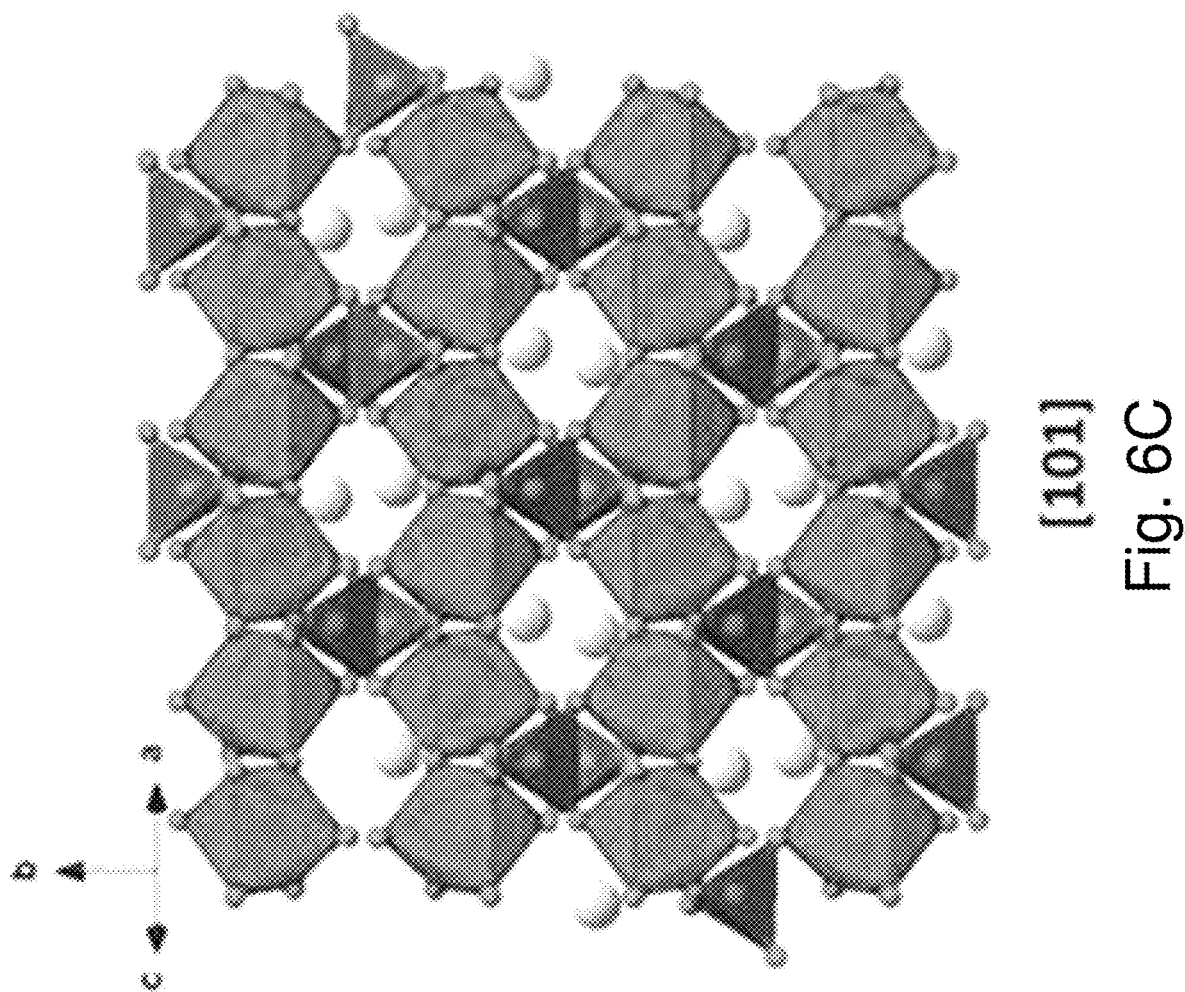
Fig. 6C [101]

[-110]

VOPO₄ CATHODE FOR SODIUM ION BATTERIES

CROSS REFERENCE TO RELATED APPLICATIONS

The present application is divisional of U.S. patent application Ser. No. 15/633,240, filed Jun. 26, 2017, now U.S. Pat. No. 11,289,700, issued Mar. 29, 2022, which is a non-provisional of and claims benefit of priority under 35 U.S.C. § 119(e), from U.S. Provisional Patent Application No. 62/355,639, filed Jun. 28, 2016, each of which is expressly incorporated herein by reference in its entirety.

STATEMENT OF GOVERNMENT RIGHTS

This invention was made with government support under DE-SC0012583 awarded by the Department of Energy. The government has certain rights in the invention.

FIELD OF THE INVENTION

The present invention relates to the field of electrode materials for batteries, and more particularly to a vanadyl phosphate cathode for a sodium ion battery.

BACKGROUND OF THE INVENTION

Energy conversion and storage have become more and more important in transportation, commercial, industrial, residential, and consumer applications. In particular, large-scale implementation of renewable energy, increasing ubiquity of portable electronics, and the next generation of electric vehicles require inexpensive and efficient energy storage systems.

In the past several decades, the advanced electrical energy storage systems were primarily based on lithium ion battery technologies. However, there is a rapidly increasing concern for the scalability of lithium ion-based system (e.g., electric vehicles, electric grids, stationary applications) due to the limited abundance and high cost of lithium. Sodium is an attractive alternative to lithium due to the greatly lower cost and wider global abundance of sodium (e.g., $150 vs. $3000 per ton, metal price). Therefore, sodium ion batteries have attracted increasing attention from both academia and industry.

In order to practically operate the sodium-based system, there is a huge demand of suitable electrode materials, especially on the cathode side. Due to the much larger size of Na⁺ (1.02 Å) than Li⁺ (0.76 Å), successful intercalation host materials should possess channels and interstitial sites compatible with the larger size of the sodium cation. The capacity of a sodium ion anode material is lower than a lithium ion anode material. Moreover, for the full device, the lower operating voltage (i.e., −2.7 V for Na/Na⁺ vs. SHE) can make the energy of sodium-based devices even lower.

Therefore, it is desirable to develop a cathode with high capacity, high working potential and practical cyclability. Various types of sodium ion battery cathode materials have been developed, such as layered oxides (e.g., $NaMnO_2$), tunnel oxides (e.g., $Na_{0.44}MnO_2$), olivine (e.g., $Na_xFe_{0.5}Mn_{0.5}PO_4$), polyphosphates (e.g., $Na_2FeP_2O_7$), NASICONS (e.g., $Na_3V_2(PO_4)_3$), and fluorophosphates (e.g., $NaVPO_4F$), etc. Based on a comparative study of the critical cathode attributes, including capacity, energy density and safety, vanadium-based phosphates cathodes should be the relatively optimized choice. See, Stanislav S. Fedotov, Nellie R. Khasanova, Aleksandr Sh. Samarin, Oleg A. Drozhzhin, Dmitry Batuk, Olesia M. Karakulina, Joke Hadermann, Artem M. Abakumov, and Evgeny V. Antipov; "AVPO₄F (A=Li, K): A 4 V Cathode Material for High-Power Rechargeable Batteries"; Chem. Mater., 2016, 28 (2), pp 411-415 (Jan. 4, 2016), DOI: 10.1021/acs.chemmater.5b04065, expressly incorporated herein by reference in its entirety.

Phosphate based materials have been considered as excellent cathode candidates because of their high stability and low cost. However, most phosphate cathodes show poor electronic conductivity and as a result, full capacity of the cathode can't be achieved in the traditional charge/discharge processes.

One approach to obtain a cathode of high capacity is to employ a transition metal capable of multiple electron transfer, and thus able to assume more than one sodium. Vanadium is well-known to be capable of transfer of two electrons, such as from the +5 to +3 oxidation state.

Vanadyl phosphate ($VOPO_4$) is a material combining the merits of vanadium and of phosphate and theoretically has the possibility to show high capacity as well as good stability as a cathode active material for a sodium battery. The vanadyl phosphates with formula of $AVOPO_4$ (A=alkali metal) form a class of materials which can serve as a multi-electron cathode. These cathodes can utilize the $V^{3+}$-$V^{4+}$-$V^{5+}$ redox couples, during which two ions can be reversible stored in the structure instead of one. Therefore, this class of cathode materials is expected to exhibit much higher energy density than the traditional one-electron cathodes. By far, the two-electron behavior only has been observed in Li ion system (i.e., two-Li) in some different phases of $VOPO_4$ and $LiVOPO_4$, within a voltage window covering the $V^{3+} \rightarrow V^{5+}$ transition, which exhibits enhanced practical energy densities. However, the two-electron behavior has never been seen for two-Na storage in the vanadyl phosphate cathode materials. In fact, considering the intrinsic low energy density of sodium ion-based systems, the multi-electrode sodium ion cathode would be even more desirable.

For instance, graphite, the commercial anode active material in lithium-ion batteries, cannot accommodate the insertion of Na to a concentration higher than $Na_{0.0625}C_6$ and is electrochemically irreversible. As a result, graphite is unsuitable as a sodium-ion battery anode. Thus, the fundamental differences between lithium and sodium appear to dictate that it may be impossible to simply adopt the knowledge and the techniques developed for lithium-ion batteries to sodium-ion batteries.

Vanadium phosphate materials have been described as cathode materials.

For example, U.S. Pat. No. 6,872,492 (Barker et al.) describes sodium ion batteries based on cathode materials of the general formula: $A_aM_b(XY_4)_cZ_d$. Example 4b describes synthesis of $VOPO_4 \cdot xH_2O$ and Examples 4c and 4d describe synthesis of $NaVOPO_4$. Charge and discharge of a cell containing a cathode of the $NaVOPO_4$ and a negative electrode of lithium metal is described. Sodium ion cells prepared are based on a carbon composite negative electrode and $NaVOPO_4F$ as the positive electrode active material.

U.S. 2013/0034780 (Muldoon et al.) describes a magnesium battery and lists $VOPO_4$ as a suitable positive electrode active material.

U.S. 2004/0048157 (Neudecker et al.) describes a lithium solid state thin film battery containing a lithiated vanadium oxide film as an anode and as one possible cathode material, $LiVOPO_4$.

U.S. 2013/0260228 (Sano et al.) describes a lithium secondary battery having as a positive electrode material, a compound of the formula: $Li_a(M)_b(PO_4)_cF_d$. $LiVOPO_4$ is described in a preferred embodiment.

U.S. 2013/0115521 (Doe et al.) describes a magnesium secondary battery wherein the current collectors are coated with a thin protective coating. $VOPO_4$ is listed as a positive electrode active material.

U.S. 2012/0302697 (Wang et al.) describes a magnesium cell having a carbon or other graphitic material as a cathode active material. $VOPO_4$ is included in a list of other cathode active materials.

It is an object of this invention to provide safe, efficient and a high-capacity cathode active material for use in a sodium battery.

A prior attempt at an improved cathode material for a sodium ion battery employed $\varepsilon$-$VOPO_4$ as an active ingredient, wherein the electrode is capable of insertion and release of sodium ions. See, U.S. Ser. No. 14/735,894 filed Jun. 10, 2015, expressly incorporated herein by reference in its entirety. Upon electrochemical cycling, the cathode may contain regions of material of formula $Na_x(\varepsilon\text{-}VOPO_4)$ wherein x is a value from 0.1 to 1.0. $\varepsilon$-$VOPO_4$ is capable of insertion and deinsertion of sodium ions without significant degradation of the structure after the first insertion cycle. The first discharge profile was much different from that of the following cycles.

Seven distinct $VOPO_4$ structures or phases are known. All of the reported structures contain $VO_6$ octahedra sharing vertices with $PO_4$ tetrahedra. The oxygen polyhedron of vanadium is irregular so that it is often considered as a $VO_5$ square pyramid with a very short apical vanadyl bond (V=O) and a much more remote sixth oxygen atom (V . . . O). These seven phases can be distinguished as:

- $\alpha_I$: has a lamellar structure with alternating antiparallel V=O bonds pointing inside the layers.
- $\alpha_{II}$: also has a lamellar structure with antiparallel V=O bonds pointing outside the layers.
- $\gamma$: is an intermediate form between $\alpha_I$ and $\alpha_{II}$ with half parallel V=O bonds pointing inside, half outside the layers.
- $\delta$: has antiparallel V=O bonds pointing half inside, half outside the layers. The vanadyl chains point to different directions in the unit cell.
- $\omega$: shows disordered vanadyl chains in the [1 0 0] and [0 1 0] directions of the tetragonal cell.
- $\beta$: All vanadyl chains are parallel and tilted to form zigzag O=V . . . O=V chains.
- $\varepsilon$: The structure is a distorted form of $\beta$-phase and differs in terms of tilted O=V . . . O angle.

Examples of anode materials identified for anode construction of a sodium battery are shown in the following Table. The energy density in Table 1 is calculated with a cathode voltage at 3.4 V.

TABLE 1

Anode materials.

| Anode | Sodiation voltage (V vs. Na/Na$^+$) | Capacity (mAh/g) | Energy density | Volumetric expansion | Diffusion barrier (eV) |
|---|---|---|---|---|---|
| Hard carbon (a) | 0.01 | 300 | 1017 | ~0% | |
| Tin (b) | 0.20 | 845 | 2704 | 318% | |
| Antimony (c) | 0.58 | 659 | 1858 | 285% | |
| Titanate (d) | 0.3 | 300 | 930 | ~10% | 0.25-0.41 |
| BC$_3$ boron-doped graphene (e) | 0.44 | 762 | 2256 | ~0% | 0.16-0.28 |

(a) Komaba et al., "Electrochemical Na Insertion and Solid Electrolyte Interphase for Hard-Carbon Electrodes and Application to Na-Ion Batteries," Adv. Fund. Mater. 21, 3859, 2011.
(b) Zhu et al., "Tin Anode for Sodium-Ion Batteries Using Natural Wood Fiber as a Mechanical Buffer and Electrolyte Reservoir," Nano Lett., 13, 3093, 2013.
(c) Qian et al., "High capacity of Na-storage and superior cyclability of nanocomposite Sb/C anode for Na-ion batteries," Chem. Commun. 48, 7070, 2012.
(d) Senguttuvan et al., "Low-Potential Sodium Insertion in a NASICON-Type Structure through the Ti(III)/Ti(II) Redox Couple," J. Am. Chem. Soc. 135, 3897, 2013; Sun et al., "Direct atomic-scale confirmation of three-phase storage mechanism in Li$_4$Ti$_5$O$_{12}$ Anodes for room temperature sodium-ion batteries," Nature Communications, 4, 1870, 2013.
(e) A boron-doped graphene sheet is a suitable anode material for rechargeable sodium-ion batteries. (See U.S. 2015/0147642).

The ubiquitous availability of inexpensive sodium and the increasing demand for lithium used in Li-ion batteries has prompted investigation of Na-ion batteries based on chemical strategies similar to those used for rechargeable Li-ion batteries. However, the larger Na$^+$ ions are not stable in the interstitial space of a close-packed oxide-ion array strongly bonded in three dimensions (3D). The 2D layered oxides are able to expand the space between MO$_2$ layers to accommodate the large Na$^+$ ions, but Na$^+$—Na$^+$ coulomb interactions and a preference for Na$^+$ to occupy trigonal-prismatic rather than octahedral oxide sites, lead to a sequence of phase transitions with accompanying undesirable voltage steps on removal/insertion of Na$^+$ ions.

It was shown over that fast Na$^+$ transport in an oxide requires a host framework structure having a more open interstitial space as in the NASICON structure of the Na$^+$ electrolyte $Na_{1+x}Zr_2(P_{1-x}Si_xO_4)_3$ with x~2/3. However, open frameworks reduce the volumetric energy density and their activation energy for Na$^+$ diffusion limits the rate of insertion/extraction of Na$^+$ at lower temperatures, which will probably restrict the use of a Na-ion battery to stationary storage of electrical energy generated from wind and solar energy where lower cost can give a competitive advantage. Since open oxide-framework structures rely on $(XO_4)^{m-}$ polyanions in place of $O^{2-}$ ions, these phases generally have separated redox centers to give a reduced mixed-valence electronic conductivity.

The anode containing any of the above-listed materials may be mixed with other electrically conductive materials and binders. Examples of electrically conductive materials include carbon black and vapor ground carbon fibers.

Examples of binders include polyvinylidene fluoride (PVDF), sodium alginate, and sodium carboxymethyl cellulose.

The cathode active material may be mixed with conductive additives and binders recognized by one of skill in the art as suitable for sodium-ion batteries. For example, suitable binders may include PVDF, polytetrafluoroethylene (PTFE), styrene butadiene rubber (SBR), and polyimide. Suitable conductive additives may include carbonaceous materials such as acetylene black.

The cathode active material may be present as a sheet, ribbon, particles, or other physical form. An electrode containing the cathode active material may be supported by a current collector. A current collector may include a metal or other electrically conducting material. The current collector may be formed of carbon, carbon paper, carbon cloth or a metal or noble metal mesh or foil.

Suitable electrolyte salts include, for example, $NaPF_6$, $NaBF_4$, $NaClO_4$, NaTFSI. Suitable solvents may be any solvent which is stable within the electrochemical window of the cell and is inert to other components of the cell. Examples of suitable solvents include carbonate solvents such as ethylene carbonate, diethyl carbonate, and propylene carbonate, organic ethers such as dioxolane, dimethyl ether and tetrahydrofuran and organic nitriles such as acetonitrile. Additionally, the electrolyte may be a nonaqueous polymer electrolyte such as a gel polymer electrolyte, a solid ceramic electrolyte such as sodium β"-alumina solid electrolyte (BASE) ceramic and NASICON (see, U.S. Pub. App. 20140186719) compounds. In one embodiment, the electrolyte may include additives such as fluoroethylene carbonate (FEC) in order to, for example, improve cycling.

The battery may also include a separator which helps maintain electrical isolation between the cathode and the anode. A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

See: U.S. Pat. Nos. 8,318,353; 7,901,810; 7,790,319; 7,771,628; 7,759,008; 7,041,239; 6,872,492; 4,355,162; 4,376,709; 4,376,709; 4,459,406; 5,849,434; 6,844,047; 6,872,492; 6,872,492; 6,888,663; 6,958,860; 7,041,239; 7,338,734; 7,383,083; 7,759,008; 7,759,008; 7,771,628; 7,790,319; 7,901,810; 7,939,201; 7,955,733; 7,960,058; 7,964,308; 7,972,728; 7,988,746; 7,998,617; 8,003,250; 8,057,936; 8,067,117; 8,088,512; 8,148,009; 8,148,013; 8,158,090; 8,168,326; 8,206,468; 8,206,469; 8,218,351; 8,241,789; 8,277,975; 8,282,691; 8,318,353; 8,323,831; 8,323,832; 8,361,661; 8,420,258; 8,435,678; 8,445,135; 8,449,980; 8,481,208; 8,492,031; 8,580,430; 8,586,238; 8,617,430; 8,617,745; 8,652,683; 8,658,310; 8,709,647; 8,722,227; 8,722,227; 8,722,242; 8,734,539; 8,785,043; 8,821,763; 8,852,807; 8,932,762; 8,936,871; 8,951,676; 8,951,680; 8,993,171; 8,999,571; 9,065,093; 9,077,032; 9,293,790; 9,299,966; 9,305,716; 9,349,544; 9,362,562; 20020192553; 20020192553; 20020192553; 20040005265; 20040016632; 20040016632; 20040048157; 20040066556; 20040197654; 20040197654; 20040262571; 20040262571; 20050238961; 20050238961; 20050238961; 20060110580; 20060194112; 20060194112; 20060292444; 20070031732; 20070072034; 20070072034; 20070141468; 20070141468; 20070166617; 20070190418; 20070248520; 20070292747; 20070298317; 20080261113; 20080261113; 20090214944; 20090220838; 20090220838; 20090246636; 20090311597; 20100075225; 20100078591; 20100233545; 20100266899; 20100266899; 20100303701; 20110052473; 20110052986; 20110052986; 20110052986; 20110052995; 20110159381; 20110195306; 20110200848; 20110200848; 20110229765; 20110229765; 20110274948; 20120140378; 20120164499; 20120164499; 20120214071; 20120219856; 20120219859; 20120237828; 20120270109; 20120315538; 20130034780; 20130052492; 20130059211; 20130078523; 20130078524; 20130084474; 20130084474; 20130084474; 20130115521; 20130252112; 20130252114; 20130302697; 20130344367; 20130344367; 20140099557; 20140220450; 20140242445; 20140302403; 20140370388; 20150111105; 20150132650; 20150236342; 20150236349; 20150263382; 20150303474; 20150303474; 20150311565; 20150364753; 20160028114; 20160096334; 20160111720; and 20160164152, each of which is expressly incorporated herein by reference in its entirety.

See also:

Berrah, Fadila, et al. "The vanadium monophosphates $AVOPO_4$: Synthesis of a second form β-$KVOPO_4$ and structural relationships in the series." *Solid state sciences* 3.4 (2001): 477-482.

Zima, Vítězslav, et al. "Ion-exchange properties of alkali-metal redox-intercalated vanadyl phosphate." *Journal of Solid State Chemistry* 163.1 (2002): 281-285.

Lii, Kwang-Hwa, and Wei-Chuan Liu. "$RbVOPO_4$ and $CsVOPO_4$, Two Vanadyl (IV) Orthophosphates with an Intersecting Tunnel Structure and Discrete $VO_5$ Pyramids." *Journal of Solid State Chemistry* 103.1 (1993): 38-44.

Yakubovich, O. V., O. V. Karimova, and O. K. Mel'nikov. "The mixed anionic framework in the structure of $Na_2\{MnF[PO_4]\}$." *Acta Crystallographica Section C: Crystal Structure Communications* 53.4 (1997): 395-397.

Schindler, M., F. C. Hawthorne, and W. H. Baur. "Crystal chemical aspects of vanadium: polyhedral geometries, characteristic bond valences, and polymerization of (VO n) polyhedra." *Chemistry of Materials* 12.5 (2000): 1248-1259.

Panin, Rodion V., et al. "Crystal Structure, Polymorphism, and Properties of the New Vanadyl Phosphate $Na_4VO(PO_4)_2$." *Chemistry of materials* 16.6 (2004): 1048-1055.

Belkhiri, Sabrina, Djillali Mezaoui, and Thierry Roisnel. "The Structure Determination Of A New Mixed Mono-Arsenate $K_2V_2O_2(AsO_4)_2$."3ème Conference Internationale sur le Soudage, le CND et l'Industrie des Matériaux et Alliages (IC-WNDT-MI'12). Centre de Recherche Scientifique et Technique en Soudage et Contrôle (CSC), 2012.

Glasser, Leslie, and C. Richard A. Catlow. "Modelling phase changes in the potassium titanyl phosphate system." *Journal of Materials Chemistry* 7.12 (1997): 2537-2542.

Fedotov, Stanislav S., et al. "$AVPO_4F$ (A=Li, K): A 4 V Cathode Material for High-Power Rechargeable Batteries." *Chemistry of Materials* 28.2 (2016): 411-415.

Belkhiri, Sabrina, Djillali Mezaoui, and Thierry Roisnel. "$K_2V_2O_2(AsO_4)_2$." *Acta Crystallographica Section E: Structure Reports Online* 68.7 (2012): i54-i54.

Yakubovich, O. V., V. V. Kireev, and O. K. Mel'nikov. "Refinement of crystal structure of a Ge-analogue of natisite $Na_2\{TiGeO_4\}$ and prediction of new phases with anionic $\{MTO_5\}$ radicals." *Crystallography Reports* 45.4 (2000): 578-584.

Boudin, S., et al. "Review on vanadium phosphates with mono and divalent metallic cations: syntheses, structural relationships and classification, properties." *International Journal of Inorganic Materials* 2.6 (2000): 561-579.

The electrolyte useful for the battery is one which does not chemically react with the anode or with the cathode during storage, and permits the migration of ions to intercalate the cathode-active material and vice-versa (during the discharge and charging cycles, respectively). The electrolyte may be present in a pure state (in the form of a solid, fused solid or liquid) or it may be conveniently dissolved in a suitable solvent. As a general rule, the electrolyte material should consist of a compound of the same species as that which is selected for the anode-active material. Thus, useful electrolytes may be conveniently represented by the general formula LY wherein L is a cationic moiety selected from the same materials useful as the anode-active material and Y is an anionic moiety or moieties such as halides, sulfates, nitrates, beta-aluminas, phosphofluorides, perchlorates and rubidium halide. The electrolyte may be present in a pure state in the form of a solid, fused solid (i.e., molten salt) or liquid or it may be conveniently dissolved in a suitable solvent which does not generally hydrolyze or degrade under conditions within the battery. Such electrolytes include ketones, esters, ethers, organic carbonates (such as propylene carbonate), organic lactones, organic nitriles, nitrohydrocarbons, organic sulfoxides, etc. and mixtures thereof. Where the solvent is utilized, the electrolyte salt may be present in a concentration determined by the desired solution conductivity, solubility and chemical reactivity.

The electrolyte may include additives to reduce flammability, such as phosphazenes, e.g., cyclic phosphazenes.

During initial cycling, a solid electrolyte interphase layer (SEI layer) forms in an electrolyte battery, representing insoluble breakdown products of the electrolyte in combination with other battery components, such as electrode material. The SEI layer serves to protect the electrolyte from further free radical reactions during overvoltage periods, e.g., during charging.

SUMMARY OF THE INVENTION

The present technology provides a vanadyl phosphates $KVOPO_4$ cathode which has achieved multi-electron storage as sodium ion battery cathode.

Vanadyl phosphates in general, including potassium vanadyl phosphate $KVOPO_4$ have low intrinsic conductivity. A high efficiency battery cathode should have low electrical resistance. To overcome the conductivity problem, the cathode material is preferably nanosized, and coated with particles of a conductive material, such as carbon particles.

The potassium vanadyl phosphate ($KVOPO_4$) cathode material is preferably used in sodium ion batteries. This cathode utilizes the two redox couples of vanadium cation (i.e., $V^{5+}/V^{4+}$, $V^{4+}/V^{3+}$) to permit more than one sodium ion to be stored in the unit structure per vanadium ion. The involvement of the multiple redox processes of vanadium is reflected by the well separated high voltage plateau region at ~3.8 V and low voltage plateau region at ~2V.

The two-electron redox property of vanadium results in a theoretical capacity of 266 mAh/g. In practical, maximum 181 mAh/g discharge capacity was obtained within the voltage region of 1.3-4.5 V vs. $Na/Na^+$, which is 68% of the theoretical value. 90% of the maximum capacity can be maintained over 28 repeated charge/discharge cycles. Using a combination of ex situ X-ray diffraction (XRD) measurement and galvanostatic intermittent titration (GITT) test. A Slight peak shift of the XRD peaks at different states of reaction and the continuous sloppy change in voltage in GITT curve indicated that the $KVOPO_4$ cathode probably undergoes a one-phase solid solution mechanism during charge/discharge.

The electrode material is not limited to use in batteries, or as a cathode, or for use in sodium ion electrolyte systems. The $KVOPO_4$ may be used as an electrode for a device having any alkali metal, including for Li, Na, K, Cs, Rb, as well as C, Al, Sn, Si, Ge, and any combinations thereof.

The $KVOPO_4$ may be used as a cathode material in combination with silicon-containing or silicon-rich (e.g., substituting for graphite) anodes in a sodium-ion, lithium-ion, or other metal ion battery systems. Alternatively, the potassium may be removed prior to use, leaving the large tunnels in the $VOPO_4$ material.

In addition to $VOPO_4$ material, the cathode may further contain any cathode material suitable for sodium-ion insertion and release. Suitable auxiliary materials may include phosphate-based materials such as $FePO_4$, $VPO_4F$, $V_2(PO_4)_2F_3$, $FePO_4F$, and $V_2(PO_4)_3$; oxides such as $CoO_2$, orthorhombic $MnO_2$, layered iron oxides $FeO_2$, chromium oxide $CrO_2$, layered $Ni_{0.5}Mn_{0.5}O_2$, and $V_6O_{15}$ nanorods; layer sulfides such as $TiS_2$; perovskite transition metal fluorides such as $FeF_3$; $Na^+$ superionic conductor (NASICON)-related compounds, or a mixture thereof. These materials may be sodium and/or potassium complexes, either as provided within the battery as manufactured, or as may result during operation.

A new material (i.e., $KVOPO_4$) was synthesized and tested as a cathode material for sodium ion batteries. It is a multi-electron cathode which can store more than one sodium ion during a single charge/discharge process. The multi-electron feature makes $KVOPO_4$ a high energy density sodium ion battery cathode, which could be applied in electrical vehicles, portable electronics, grid applications, etc.

The application of the sodium ion battery has been greatly limited by its intrinsic low energy density. The cathode side is typically the bottleneck of the energy density improvement in sodium ion batteries. Basically, the normal cathodes can store a maximum of one sodium ion (i.e., one electron charge) per molecule, which limits capacity. The present technology makes it possible for the cathode material to store more than one sodium ion in each single charge/discharge process, which can greatly increase the energy density of sodium ion battery devices. The sodium ion battery has great potential to be an alternative of lithium ion battery due to the more abundant thus much cheaper sodium. As the key component of sodium battery, the $KVOPO_4$ cathode has extremely broad market prospects.

The $KVOPO_4$ phase was prepared through a solid state reaction method. The reagents utilized were $K_2CO_3$, $NH_4H_2PO_4$ and $NH_4VO_3$ with molar ratio of 0.5:1:1. The reagent powers were firstly mixed by 4 h planetary ball milling. The obtained precursor was pressed at pressure of 3 tons for 2 minutes, in order to get pellets for the following solid state reaction. The reaction temperature was set as 600° C., 700° C. and 800° C. The heating rate is 5° C./min. The soaking (dwell/holding) time at the reaction temperatures is 10 hrs. After reaction, the furnace was cooled down to room temperature naturally. An argon atmosphere was utilized during both the heating and soaking processes. The as prepared $KVOPO_4$ powers was also ball milled together with super P ($KVOPO_4$:C=7:2) in order to achieve particle-size reduction and carbon coating. The ball milling time parameters were 0.2 h, 0.4 h, 0.6 h. A slurry of 90% $KVOPO_4/C$ composite, and 10% PVDF binder dissolved in N-methylpyrrolidone was coated on aluminum foil and then dried at 110° C. overnight to obtain the electrodes. The typical mass loading of the electrodes was 2 mgcm$^{-1}$. An electrolyte of 1M NaPF$_6$ in propylene carbonate (PC) and polyethene-based separator were utilized for Na-ion battery tests.

This new cathode material could be used in sodium ion batteries for reversible sodium storage. The battery may be fabricated in any desired form factor, including cylindrical cells, prismatic cells, button cells, etc. A particularly preferred form factor are large-scale cells for grid energy storage, industrial and/or commercial scale systems, large vehicles, and the like. These batteries may also be used for portable electronics power sources (e.g., cellphone, laptop, etc.), electric vehicles (e.g., hybrid car, bus, etc.), and stationary facilities.

An advantage of vanadyl phosphate materials intrinsically formed with potassium, is that they preserve a large cell size. KVOPO$_4$ thus has an advantage over the other VOPO$_4$ materials, in that the larger cell volume allows for the more rapid diffusion of sodium into and out of the structure. Further, KVOPO$_4$ has advantages over competitive cathodes, such as other ceramic cathode materials, layered transition metal oxides, tunnel-type transition metal oxides, olivine phosphates, pyrophosphates, mixed polyanions, NASICON materials, fluorophosphates, fluorides, etc., in that the present technology provides a higher energy density (both gravimetric and volumetric) and better safety, which are the most important two factors for today's Li/Na ion battery products.

KVOPO$_4$ has a relatively large voltage gap between the two voltage plateau regions, and the second voltage region (i.e., the 2nd sodium ion) is relatively low (i.e., 1.5-2 V vs. Na/Na$^+$). These two issues could be overcome, for example, by reducing the particle size of the material and introducing more electrical conductive secondary carbon phase. The voltage gap between voltage plateaus could be reduced by the vanadium substitution method. An advanced voltage converter could be used to normalize output voltage, and thus provide high tolerance of powered devices for the change in voltage over the battery cycle.

It is therefore an object to provide an electrode comprising KVOPO$_4$ as an active ingredient, wherein the electrode is capable of electrochemical insertion and release of a metal ion selected from the group consisting of at least one of alkali and alkaline earth metal ions.

It is also an object to provide an electrode comprising VOPO$_4$ as an active ingredient, which has a volume greater than 90 Å$^3$ per VOPO$_4$, wherein the electrode is capable of electrochemical insertion and release of a metal ion selected from the group consisting of at least one of alkali and alkaline earth metal ions.

It is a further object to provide a reversible battery having a cathode comprising KVOPO$_4$ or VOPO$_4$, which has a volume greater than 90 Å$^3$ per VOPO$_4$, wherein the cathode further comprises a current collector.

Another object provides a battery comprising: an anode; a cathode; and an electrolyte comprising sodium ions; wherein the cathode comprises a current collector and an active material comprising KVOPO$_4$ or a VOPO$_4$, which has a volume greater than 90 Å$^3$ per VOPO$_4$.

The metal ions may be, for example, sodium ions, or other alkaline (Li, K, Rb, Cs) or alkaline earth (Be, Mg, Ca, Sr, Ba).

The electrode may serve as a cathode material within a sodium ion rechargeable battery.

The electrode may be provided in combination with a sodium donor anode and/or a sodium ion transport electrolyte.

The electrode may further comprise an insoluble conductive additive, such as a conductive carbon additive, or elemental carbon additive.

The KVOPO$_4$ may be formed by a solid phase synthesis process from a powdered mixture of ammonium metavanadate, ammonium phosphate monobasic, and potassium carbonate heated. The mixture may be heated at a temperature of between 600-800° C. The solid phase synthesized KVOPO$_4$ may be mixed with carbon black and milled.

The electrode may comprise KVOPO$_4$ particles and conductive additive particles, having a secondary particle size of around 2 μm, and a primary particle size of around 200 nm.

A binder may be provided, such as one or more of poly(vinylidene fluoride), polytetrafluoroethylene (PTFE), a styrene butadiene rubber (SBR), and a polyimide.

The electrode may be provided in combination with a sodium-containing anode, and a sodium transport electrolyte, to form a battery having an open circuit voltage comprising 3 volts, i.e., the range of the open circuit voltage includes 3V.

The battery may have a capacity of at least C=133 mAhg$^{-1}$.

A discharge voltage curve of the battery may comprise two major plateau regions. A higher voltage plateau region has a voltage comprising about 3.8 V, and a lower voltage plateau region has a voltage comprising about 2 V.

The electrode may be used in conjunction with an electrolyte comprising at least one of an organic nitrile, an organic ether, and an organic carbonate solvent. Such an electrolyte may be suitable for use in a sodium ion battery. The electrolyte preferably comprises an organic carbonate solvent, e.g., at least one of ethylene carbonate, diethyl carbonate, and propylene carbonate.

It is another object to provide a method of forming an electrode, comprising: milling a mixture of ammonium metavanadate, ammonium phosphate monobasic, and potassium carbonate; heating the milled mixture to a reaction temperature, and holding the reaction temperature until a solid phase synthesis of KVOPO$_4$ occurs; milling the KVOPO$_4$ together with conductive particles to form a conductive mixture of fine particles; and adding binder material to form a conductive cathode material. The reaction temperature is, for example, between 600° C. and 800° C. for about 10 hours.

BRIEF DESCRIPTION OF THE DRAWINGS

FIGS. 6A-6D show structural illustrations of the monoclinic NaVOPO$_4$ polymorph consisting of VO$_6$ octahedra (blue), PO$_4$ tetrahedra (dark green) and Na atoms (white).

DETAILED DESCRIPTION OF THE PREFERRED EMBODIMENTS

Example 1

Synthesis of KVOPO$_4$ Cathode Material 1.17 g of ammonium metavanadate, 1.15 g of ammonium phosphate monobasic and 0.69 g of potassium carbonate were uniformly mixed by 4 hours planetary ball milling in the presence of 20 mL acetone. The obtained powders were completely dried in air at room temperature, which were used as precursor for the following solid state reaction, conducted under an argon atmosphere.

The dry powders were pressed into pellets at a pressure of 3 tons for 2 mins, and each pellet has a typical weight of 200 mg. Five such pellets were used for one batch solid state synthesis. The pellets were heated to 700° C. with a heating rate of 5° C. per min, maintained at 700° C. for 10 hours, and then cooled down to room temperature at cooling rate of 5° C. per min.

Reddish brown powders were obtained after the solid state reaction process. The typical yield is 700 mg for each batch.

400 mg of KVOPO$_4$ reddish brown powder and 114 mg of carbon black were mixed using a mortar and pestle (i.e., a weight ratio of 7:2). The mixture was high energy ball milled for 12 mins. (This time may be extended to, e.g., 36 min. as may be desired). Black color powders were obtained after the ball milling. The typical yield is 450 mg for each batch.

Material Characterization

Figure 1A:
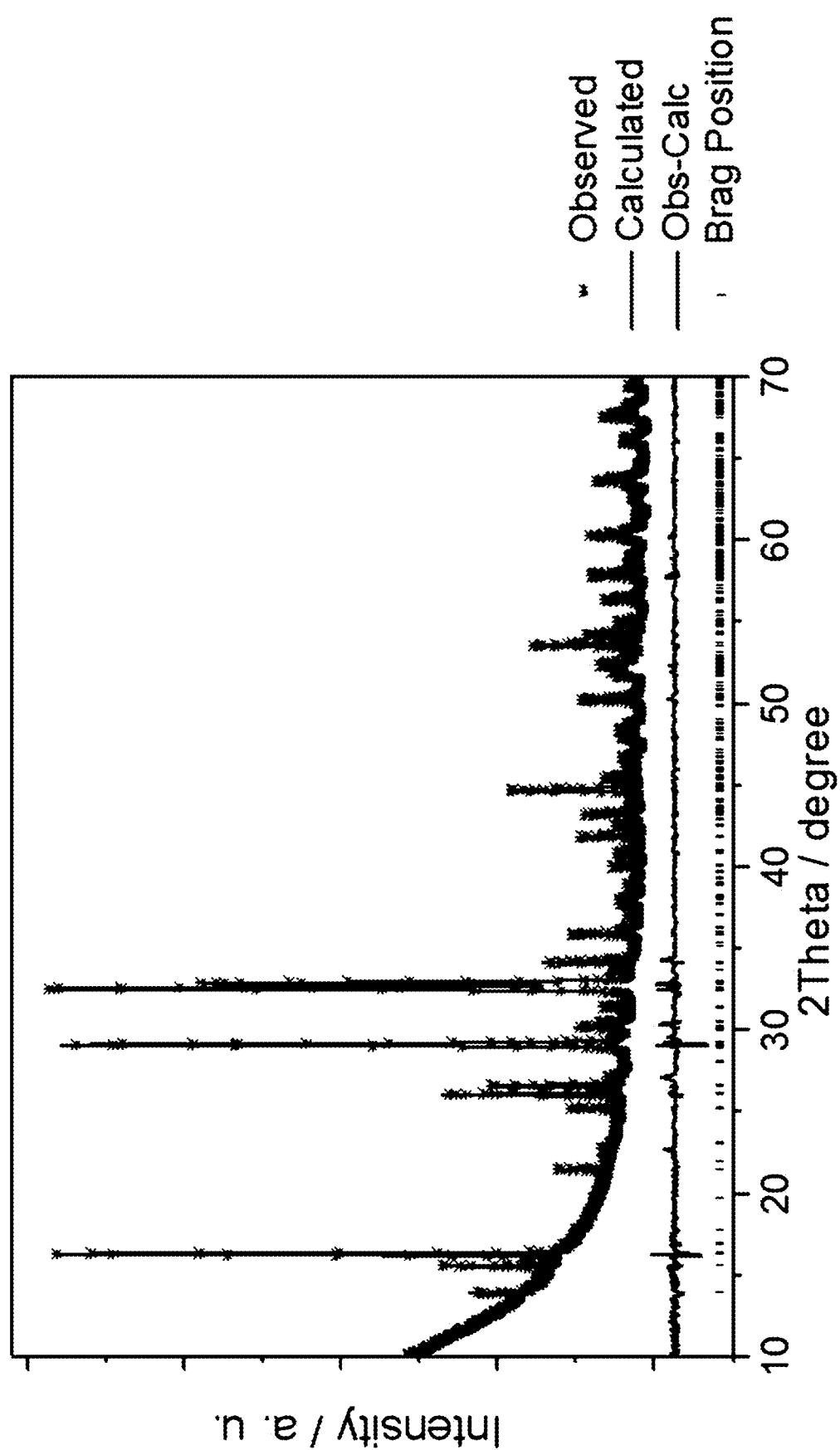
FIG. 1A shows an X-ray diffraction (XRD) pattern and Rietveld refinement of as-synthesized KVOPO$_4$.

The X-ray diffraction data was collected by a Scintag XDS2000 diffractometer equipped with Cu Kα sealed tube. XRD data Rietveld refinement was performed using the GSAS/EXPGUI package. The SEM image was collected by Zeiss Supra-55 field emission scanning electron microscope, and is shown in FIG. 1 and Table 2.

TABLE 2

XRD powder diffraction and Rietveld refinement results for KVOPO$_4$ powder sample.

| | |
|---|---|
| Symmetry | Orthorhombic |
| Space group | Pna2$_1$ |
| Lattice parameters | a = 12.7671(7) Å, b = 6.3726(2) Å, |
| | c = 10.5163(0) Å, |
| | V = 855.6(1) Å$^3$ |
| R$_{wp}$ (%) | 4.82 |
| x$^2$ | 3.423 |

Figure 1B:
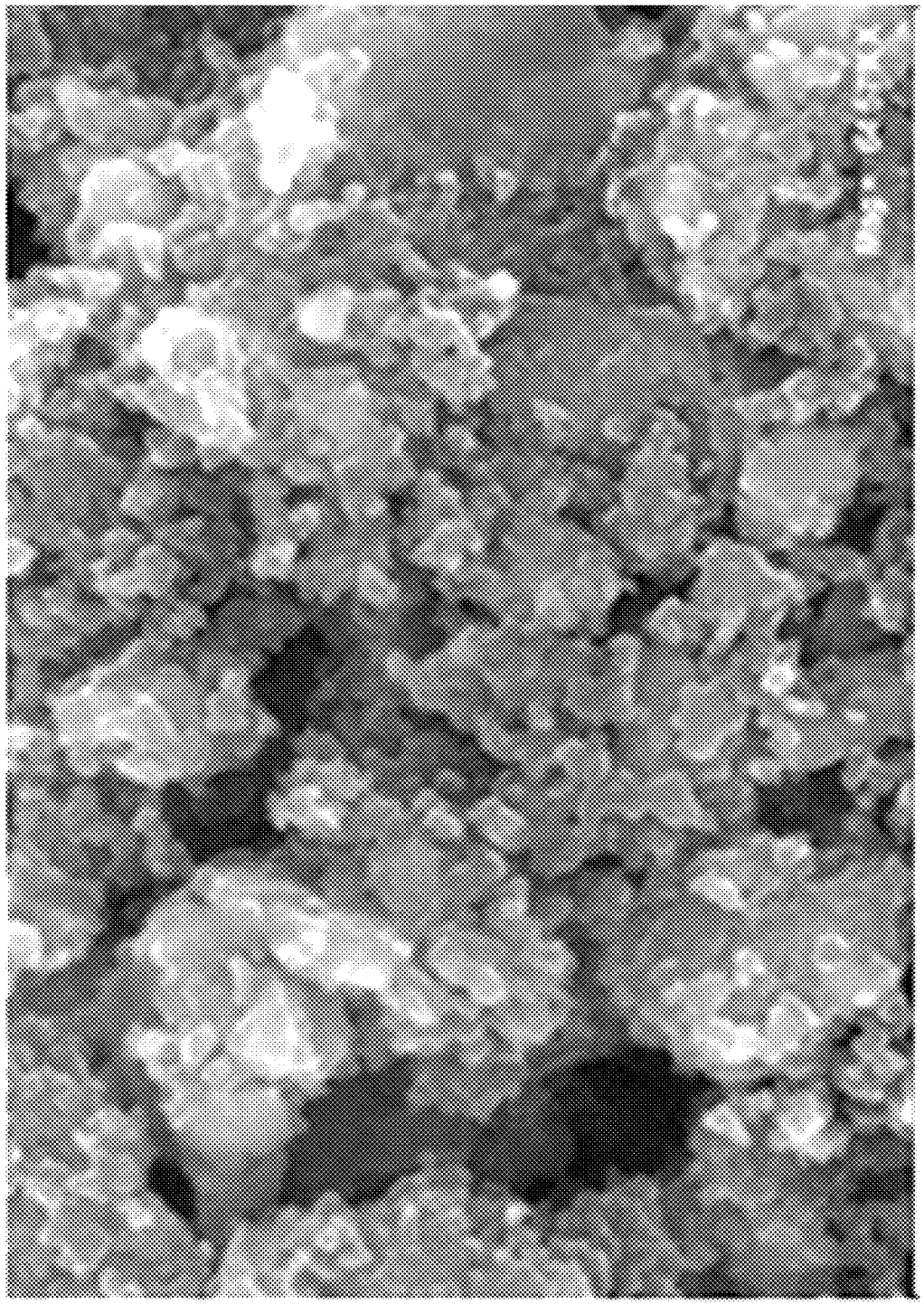
FIG. 1B shows a scanning electron microscope (SEM) image of ball milled KVOPO$_4$ cathode material.
Figure 2A:
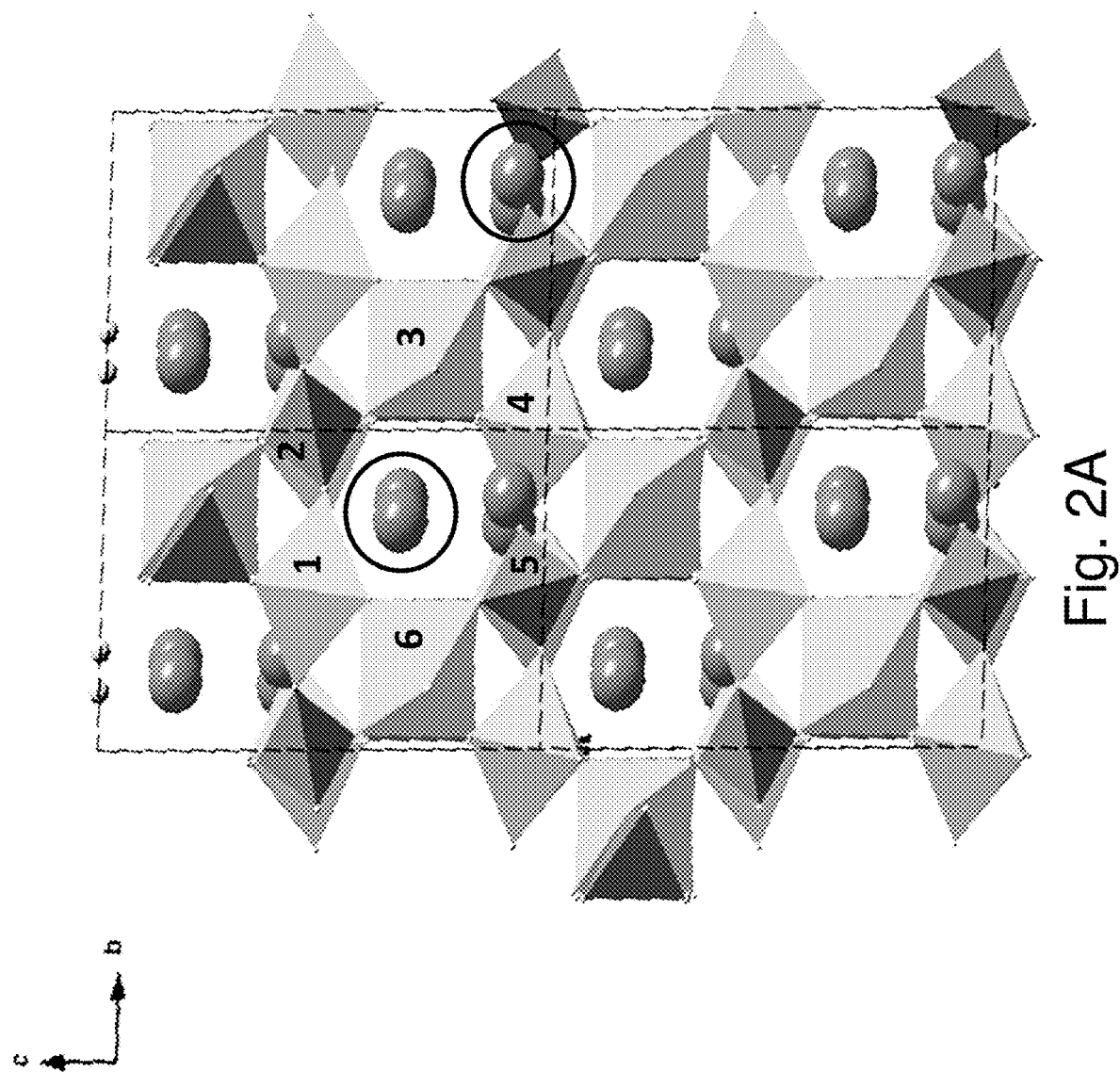
FIG. 2A shows the two intersecting six side tunnels along an a axis and a b axis, representing tunnel 1: Along the a axis, the tunnel is formed of four VO$_6$ octahedra (1,3,4,6) and two PO$_4$ tetrahedra (2,5).
Figure 2B:
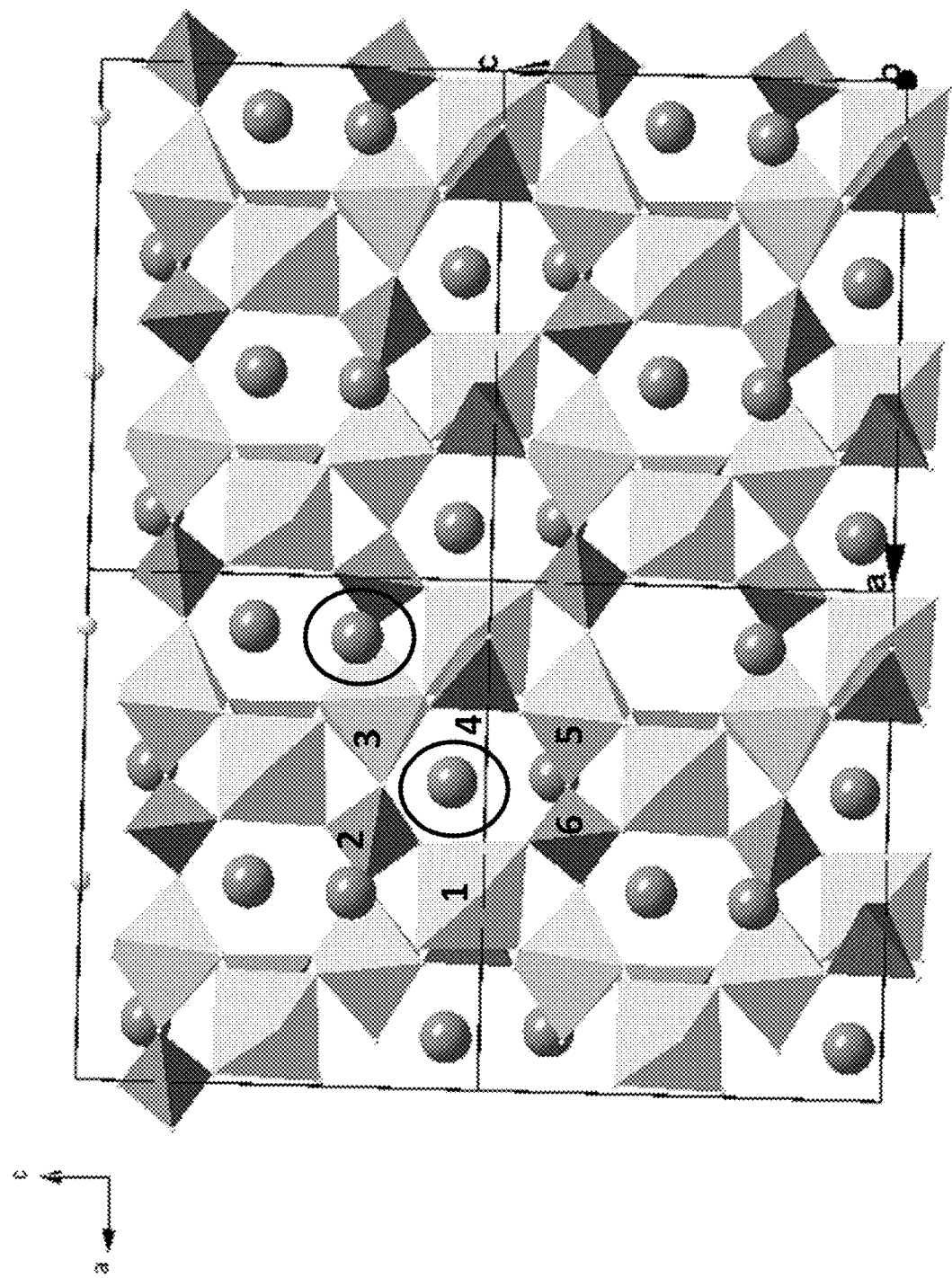
FIG. 2B shows the [VO$_3$]$_\infty$ chain, representing tunnel 2: Along the b axis, the tunnel is formed of three VO$_6$ octahedra (1,3,5) and three PO$_4$ tetrahedra (2,4,6).
Figure 2C:
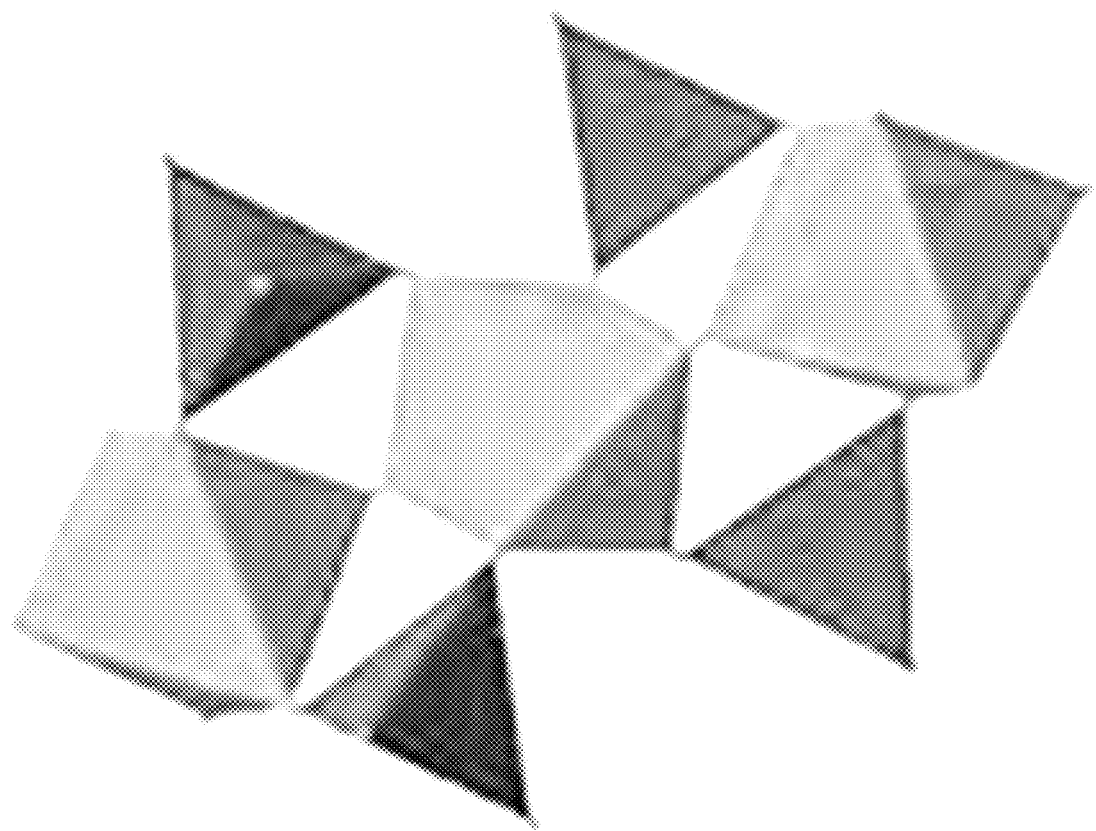
FIG. 2C shows the coordinates of vanadium cation.
Figure 2C:
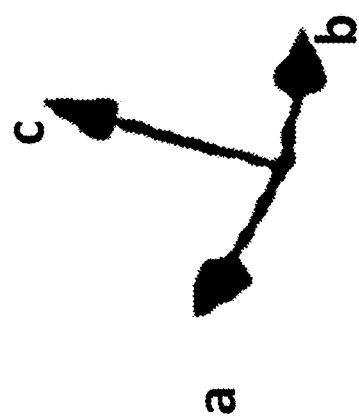
Figure 2D:
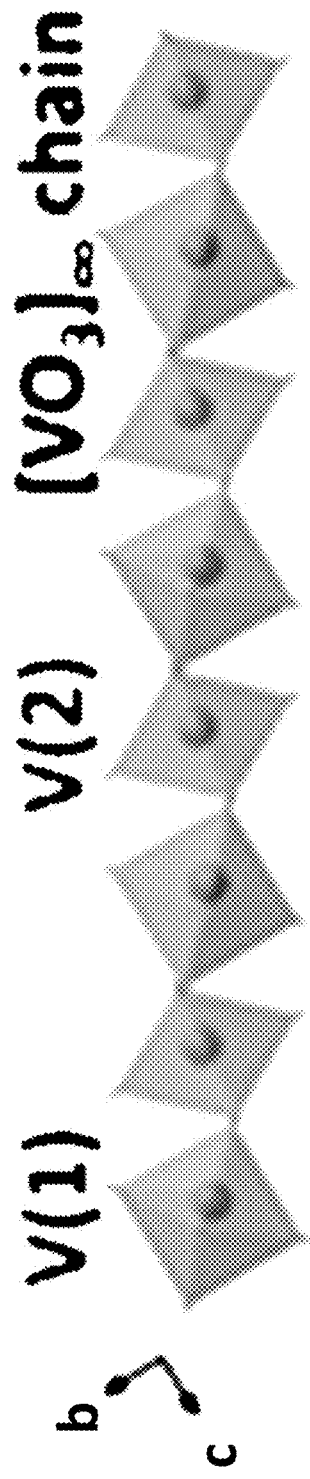
FIG. 2D shows two types of VO$_6$ tetrahedra.
Figure 2D:
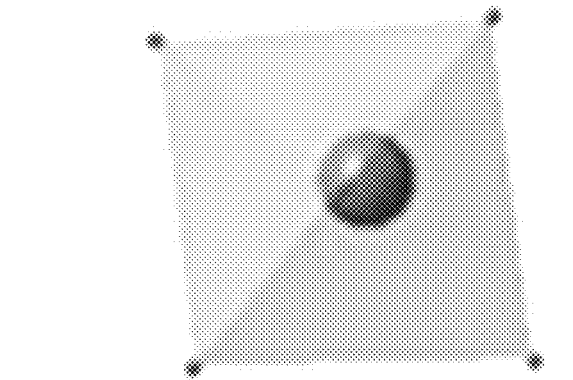
Figure 2D:
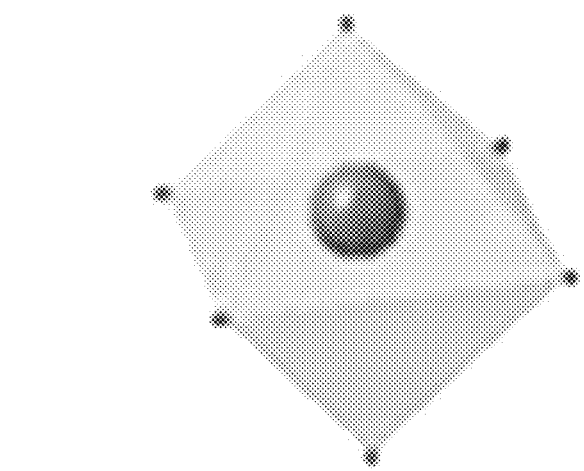
Figure 2D:
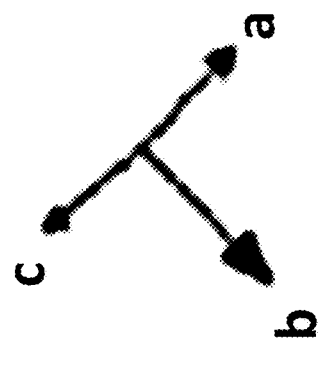

Basically, the compound was completely indexed with space group of Pna2$_1$ with orthorhombic symmetry. The cell dimension parameters (a=12.7671(7) Å, b=6.3726(2) Å, c=10.5163(0) Å, V=855.6(1) Å$^3$) is much larger comparing to the lithium and sodium counterparts. This should be due to the much larger size of potassium ions (2.76 vs. 2.04 Å). The as-prepared KVOPO$_4$ power was ball milled together with super P (weight ratio=7:2) in order to decrease the particle size of KVOPO$_4$ and wrap the smaller particles with amorphous carbons. FIG. 1B displays an SEM image of the ball milled material. The secondary particle size is around 2 μm, and the primary particle size is around 200 nm.

The remaining VOPO$_4$ framework of the KVOPO$_4$ compound is assembled by corner-sharing VO$_6$ octahedra and PO$_4$ tetrahedra. The whole VOPO$_4$ structure can provide two intersecting six side tunnels for the following Na intercalation. FIG. 2 shows the two types of tunnels along the a and b axis respectively. The tunnel along the a axis is formed of rings of two PO$_4$ tetrahedra (marked as 2, 5) and four VO$_6$ octahedra (marked as 1, 3, 4, 6). The tunnel along the b axis is formed of rings of three PO$_4$ tetrahedra (marked as 2, 4, 6) and three VO$_6$ octahedra (marked as 1, 3, 5). Due to the intersection of the two tunnels, the effective diffusion pathways for Na ions could be two or even three dimensional instead of one dimensional, which is more benefitting for the kinetics of cathode.

TABLE 3

Atomic coordinates for KVOPO4.

| | x | y | z |
|---|---|---|---|
| V(1) | 0.123949 | −0.006684 | 0.255227 |
| V(2) | 0.247143 | 0.272448 | 0.507111 |
| P(1) | 0.182754 | 0.507027 | 0.235075 |
| P(2) | −0.007772 | 0.178751 | 0.493906 |
| K(1) | 0.382056 | 0.772807 | 0.435412 |
| K(2) | 0.397591 | 0.203688 | 0.162091 |
| O(1) | 0.105733 | 0.304952 | 0.196314 |
| O(2) | 0.107539 | −0.309492 | 0.269465 |
| O(3) | −0.002507 | 0.015824 | 0.369038 |
| O(4) | 0.015493 | −0.034588 | 0.100065 |
| O(5) | 0.232475 | −0.036421 | 0.109097 |
| O(6) | 0.219554 | 0.021262 | 0.355514 |
| O(7) | 0.397020 | 0.200980 | 0.458928 |
| O(8) | 0.249809 | 0.018958 | 0.629969 |
| O(9) | 0.086298 | 0.304742 | 0.502290 |
| O(10) | 0.260082 | 0.470928 | 0.341831 |

TABLE 4

V-O bonds distance (Å) for KVOPO$_4$.

| | Bond | CN | R (Å) |
|---|---|---|---|
| V(1) | V-O$_{short}$ | 1 | 1.697(11) |
| | V-O$_{eq}$ | 4 | 1.833(15)-2.187(10) |
| | V-O$_{long}$ | 1 | 2.370(11) |
| V(2) | V-O$_{short}$ | 1 | 1.881(12) |
| | V-O$_{eq}$ | 4 | 1.889(13)-2.134(10) |
| | V-O$_{long}$ | 1 | 2.313(13) |

Figure 4A:
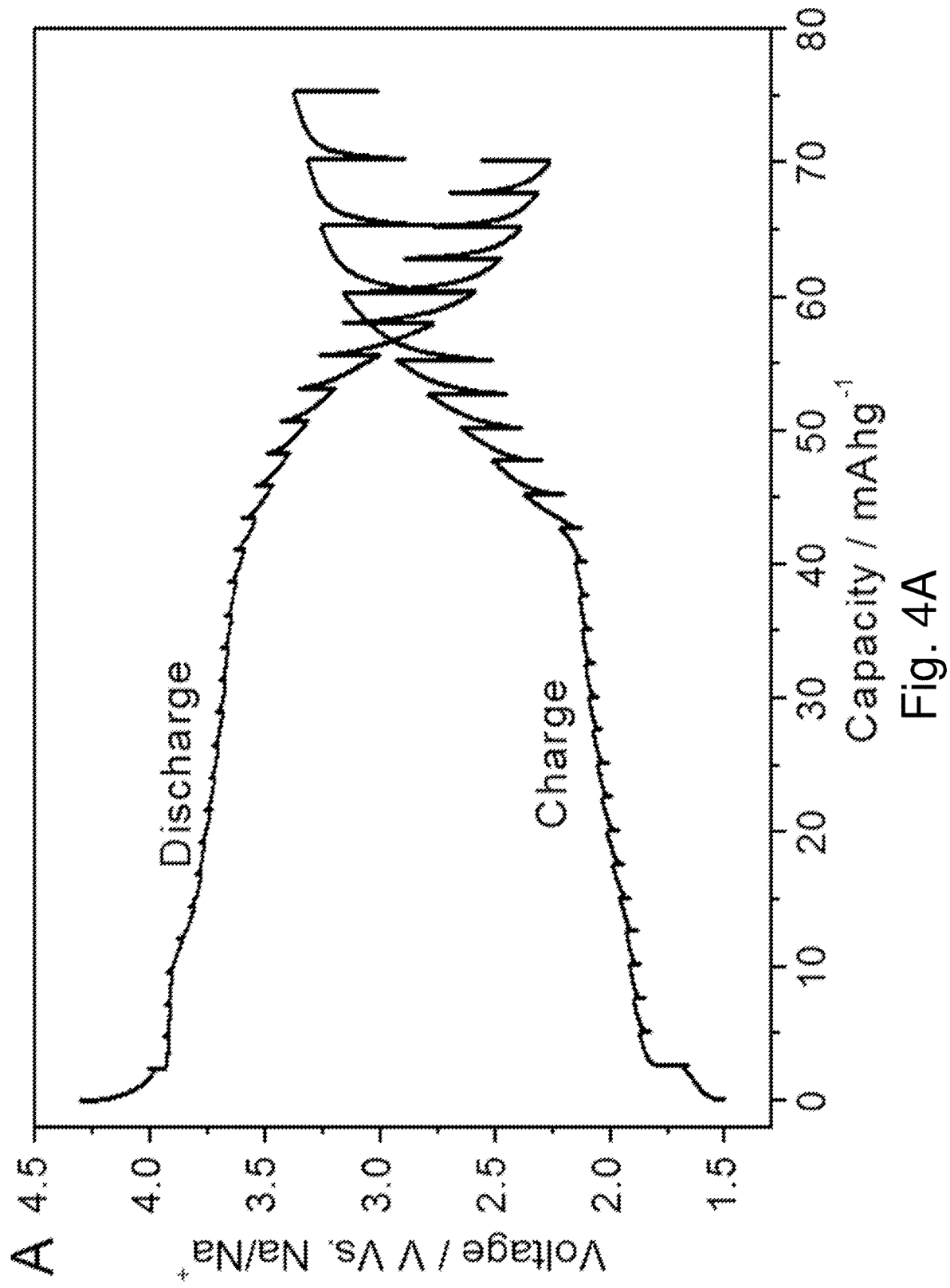
FIG. 4A shows GITT capacity-voltage profiles of the KVOPO$_4$ cathode.

The atomic coordinate values were listed in Table 3, there are two different potassium, two different vanadium (V(1), V(2)) and two different phosphorus. As shown in FIG. 4a, V(1) and V(2) alternate with each other forming the infinite [VO$_3$]$_\infty$ chain. The potassium ions sitting in the two kinds of tunnels also differ from each other in term of local coordination environment. In the VO$_6$ octahedra, the six oxygen atoms link with the central vanadium atom by one short, one long and four equatorial V—O bonds. The bond length for V(1) and V(2) were listed in Table 4. It is worthwhile to mention that the different coordinates of vanadium ions could provide different local environments around the Na sites.

Electrochemical Tests 200 mg of ball milled KVOPO$_4$/Carbon composite was mixed with 22.2 mg poly(vinylidene fluoride) (PVDF) together with 500 μL N-Methyl-2-pyrrolidone to form a uniform viscous slurry. The slurry was casted on to aluminum foil using doctor blade. After drying, circular electrodes with area of 1.2 cm$^2$ were punched from the foil with 2-4 mg of active material on each circular electrode. The electrode was immersed in a 1 M solution of sodium hexafluorophosphate in propylene carbonate. A sheet of sodium, 1.24 cm in diameter, served as the anode. 30 μL liquid electrolyte was used in each half cell (i.e., 2325-type coin cells). All manipulations were performed in a helium environment.

The initial open circuit voltage of the cell was around 3 volts. The cells were tested using a VMP2 mutichannel potentiostat (Biologic).

The electrochemical performance of KVOPO$_4$ as cathode was tested in a half cell configuration with sodium metal as both counter and reference electrode. The pristine electrode was first galvanostatically charged to a high cut-off voltage of 4.7 V vs. Na/Na$^+$ in order to furthest remove the potassium ion from the structure and oxidize V$^{4+}$ to V$^{5+}$. The current density used was C/50 (C=133 mAhg$^{-1}$). According to the charge profile, there should be side reaction of the electrolyte involved in the very high voltage region above 4.5 V. Since normal propylene carbonate electrolyte was used here, this side reaction above 4.8 V vs. Li/Li$^+$ is expected and acceptable. The subsequent discharge process should insert sodium into the electrode.

couple. Based on the specific discharge capacity of 158 mAhg$^{-1}$ (i.e., exceeding the theoretical value derived from one Na), the KVOPO$_4$ should be a two-electron cathode which should have theoretical capacity of 266 mAhg$^{-1}$. This multi-electron characteristic is rarely observed for sodium ion cathode, which is greatly helpful for solving the intrinsic low energy issue of sodium-based systems.

There is hysteresis observed in the charge/discharge profile, which is most likely due to the potential coexistence of the two redox couples. Both the high and low voltage regions exhibited additional substructure, i.e., there are slope changes along the sloppy plateau regions. These sub-plateaus indicated the multiple sodium storage sites existing in the structure and there is no preference for sodium ions to enter any specific site. This sodium site multiplicity is closely related to the different local coordinate environments of vanadium, which has been detailed discussed in the crystal structure section.

Figure 3A:
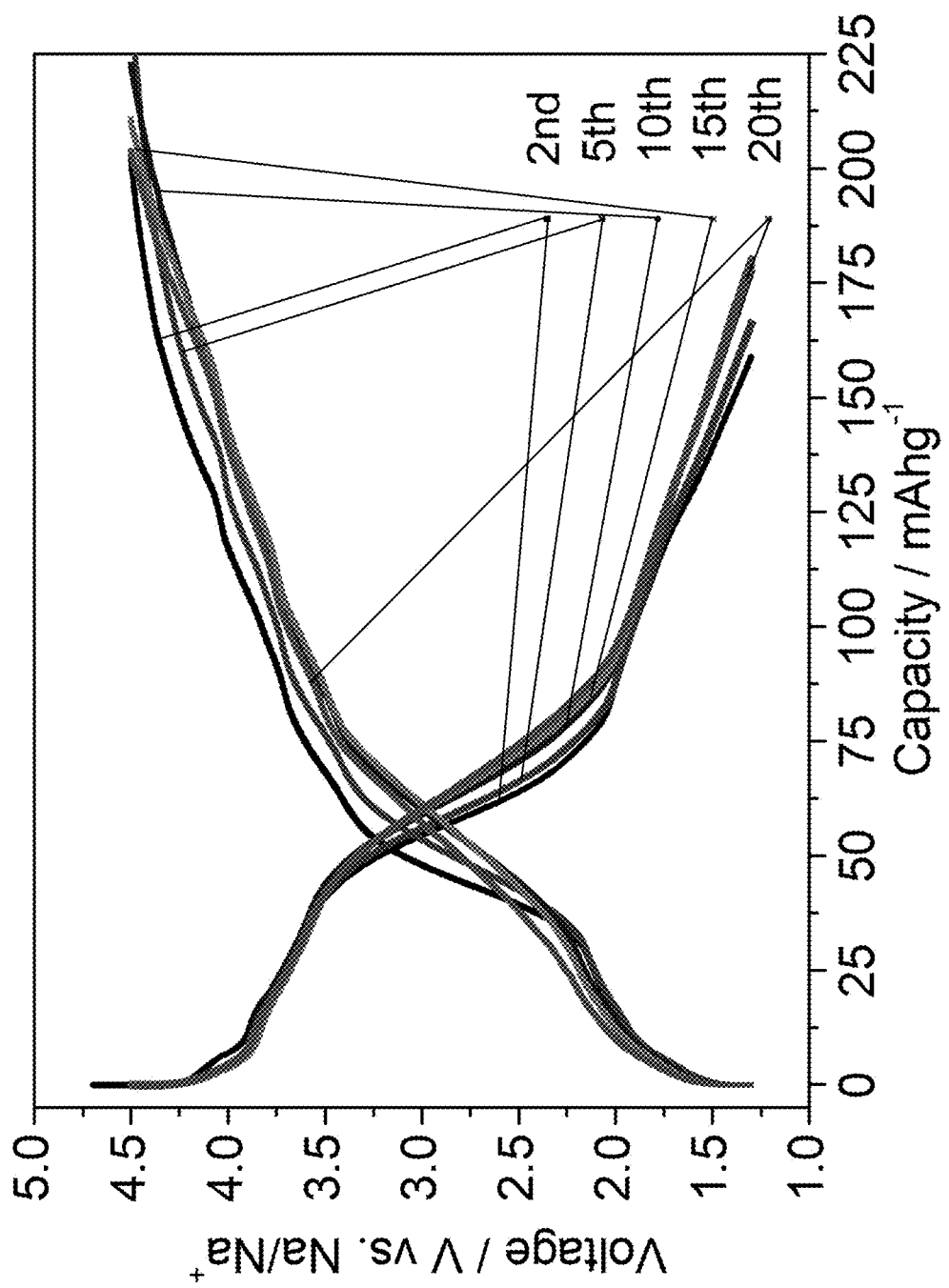
FIG. 3A shows galvanostatic charge/discharge profiles of KVOPO$_4$ cathode.
Figure 3B:
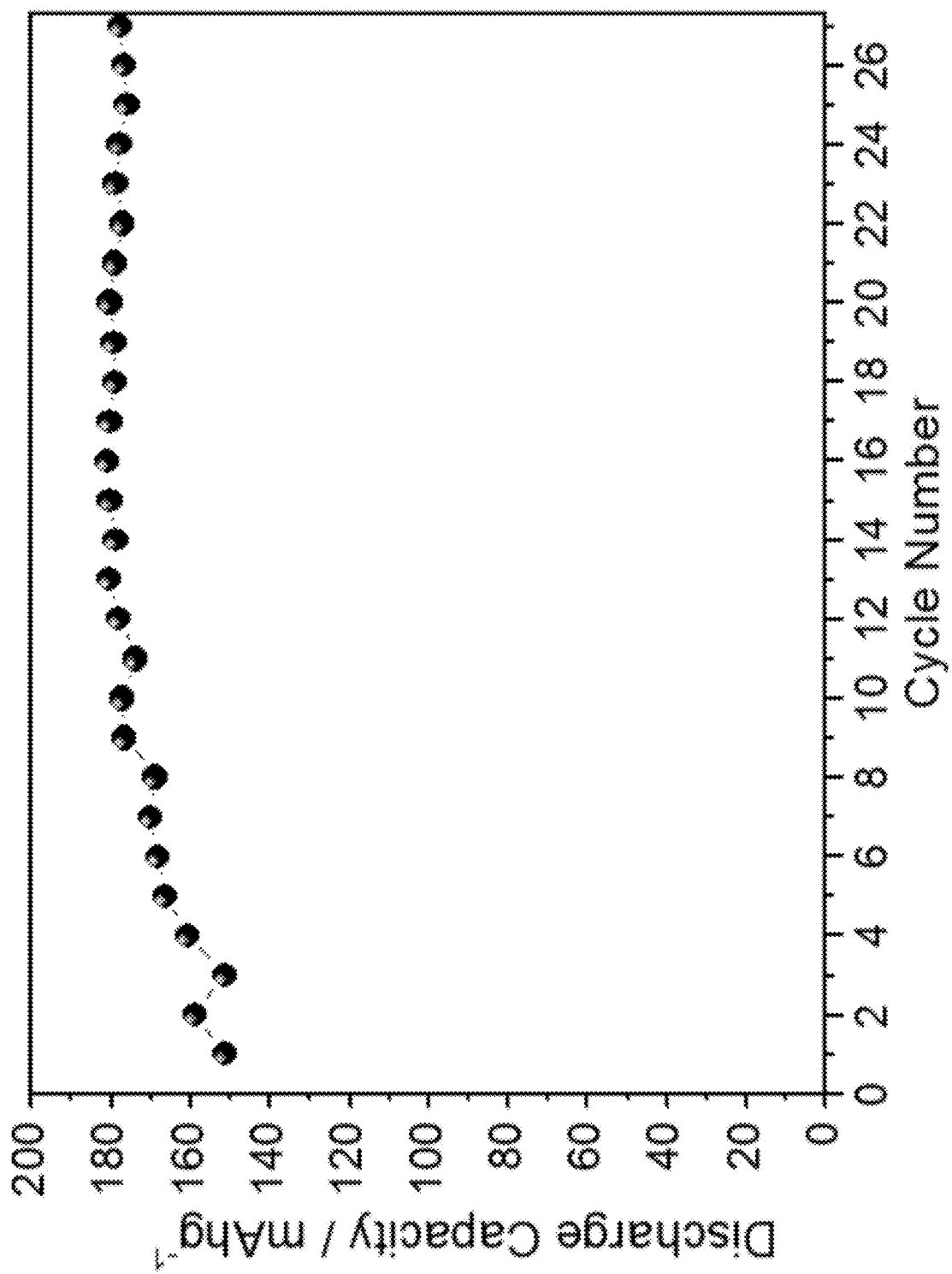
FIG. 3B shows specific discharge capacities of KVOPO$_4$ cathode as a function of cycle number.

As shown in FIGS. 3A and 3B, the KVOPO$_4$ cathode was reversible cycled over 25 cycles. The discharge capacity keeps increase during cycling with maximum value of 181 mAhg$^{-1}$, which is 68% of the theoretical capacity based on two sodium storage. The increasing discharge capacity indicated a continuously activation of the cathode, which mainly resulted from more potassium extraction from the structure. The sodium storage capability of KVOPO$_4$ could be further improved by more deeply removing potassium from the structure to empty more sodium intercalation sites.

The properties of various cathode materials for use in sodium ion batteries are shown in Table 5, in comparison to KVOPO$_4$.

TABLE 5

Properties of cathode materials.

| | KVOPO$_4$ | Layered oxide (e.g., NaMnO$_2$) | Tunnel oxide (e.g., Na$_{0.44}$MnO$_2$) | Olivine (e.g., Na Fe Mn$_{0.5}$PO$_4$) | Pyrophosphates (e.g., Na$_2$FeP$_2$O$_7$) | NASICONS (e.g., NaV(PO)) | Fluorophosphates (e.g., NaVPO$_4$F) | Fluorides (e.g., FeF) |
|---|---|---|---|---|---|---|---|---|
| Capacity (mAhg$^{-1}$) | 180 | ~185 | ~140 | ~93 | ~90 | ~140 | ~120 | ~125 |
| Energy density (Whkg$^{-1}$) | 442.5 | ~470 | ~400 | ~280 | ~300 | ~330 | ~400 | ~350 |
| Voltage window (V) | 1.5-4.3 | 2.0-3.8 | 2-3.8 | 2-4 | 2-4.5 | 1.2-3.5 | 3-4.5 | 1.5-4 |
| Safety (thermal stability) | stable up to 600° C. | stable up to ~300° C. | stable up to ~300° C. | stable up to ~600° C. | stable up to ~600° C. | stable up to ~450° C. | stable up to ~500° C. | stable up to ~320° C. |
| Materials costs | Depending on the element the specific cathode material contains. | | | | | | | |
| Mfg costs | Largely depending on the synthesis strategy and elements contained for a specific cathode material. | | | | | | | |

As shown in FIG. 3A, discharge capacity of 158 mAhg$^{-1}$ was obtained in the first discharge (i.e., 2$^{nd}$ cycle) at current density of C/50. After discharging the electrode was charged back to cut-off voltage of 4.5 V vs. Na/Na$^+$ to remove sodium again. In the following cycles, the electrode swung between 1.3 and 4.5 V vs. Na/Na$^+$. Apparently, the electrode exhibited two major plateau regions within the voltage window. The higher voltage plateau region was centered at ca. 3.8 V and the low voltage plateau region was centered at ca. 2 V.

Figure 4B:
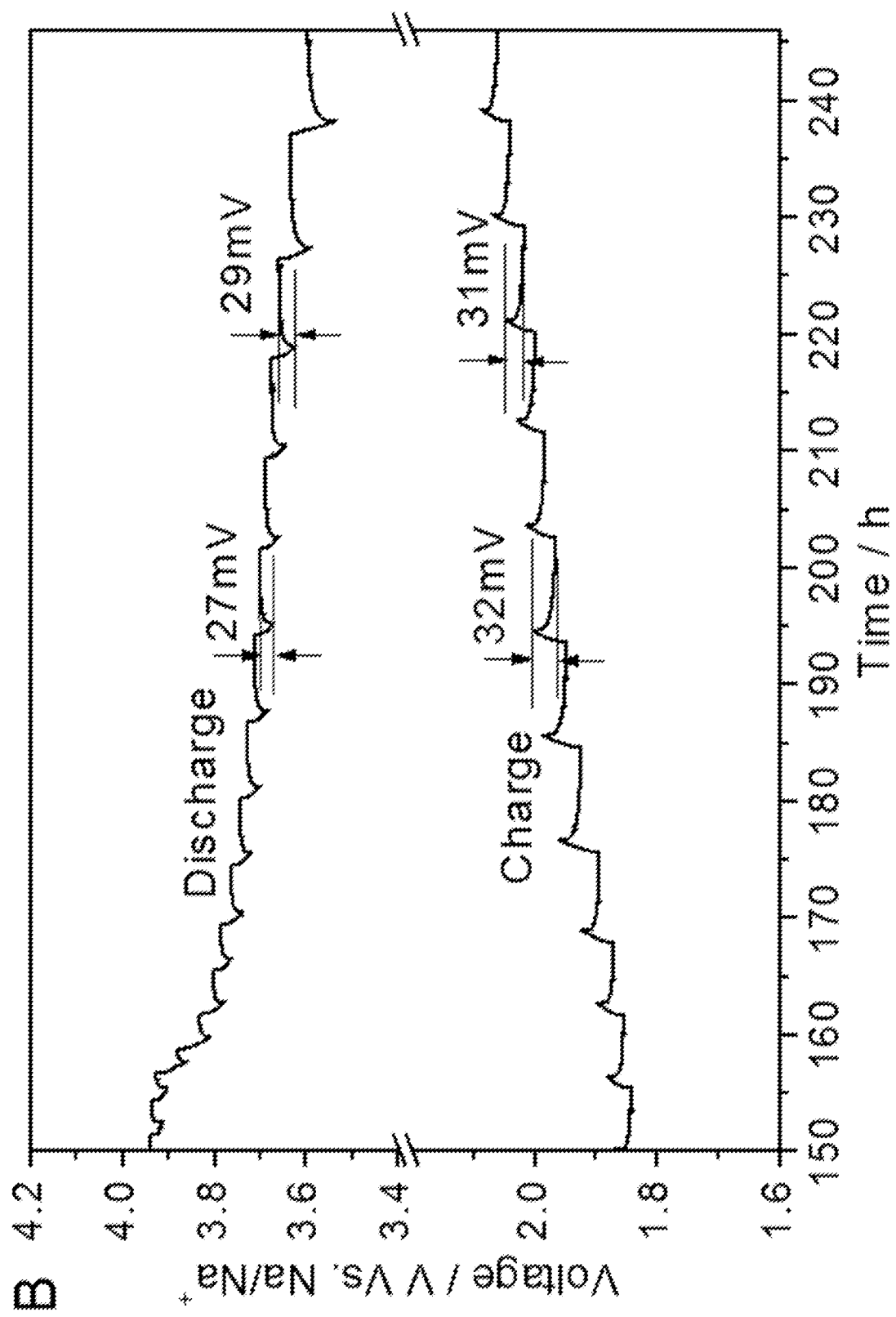
FIG. 4B shows GITT time-voltage profiles of the KVOPO$_4$ cathode.
Figure 5A:
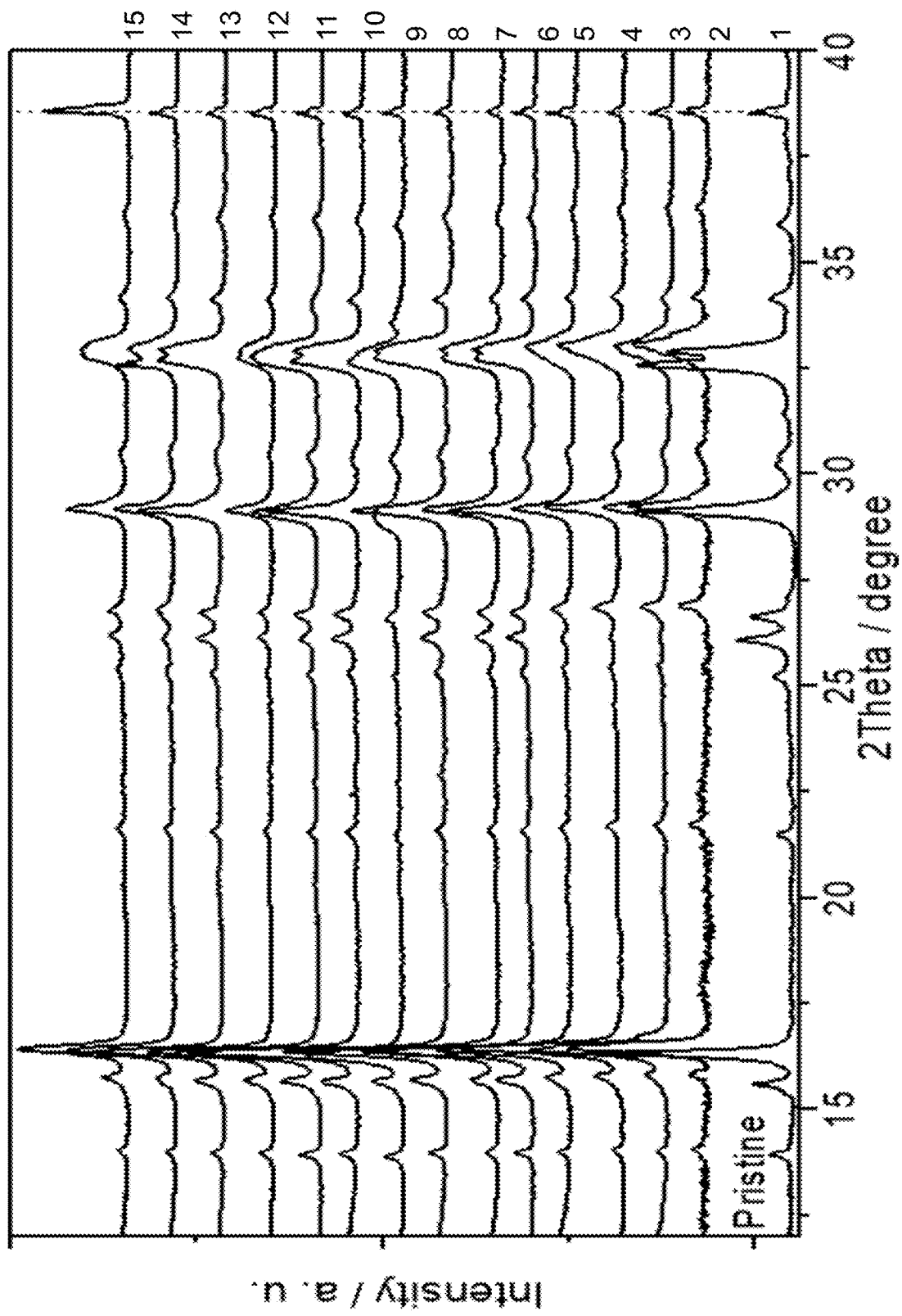
FIGS. 5A-5D show ex situ XRD patterns at different states of charge/discharge.
Figure 5B:
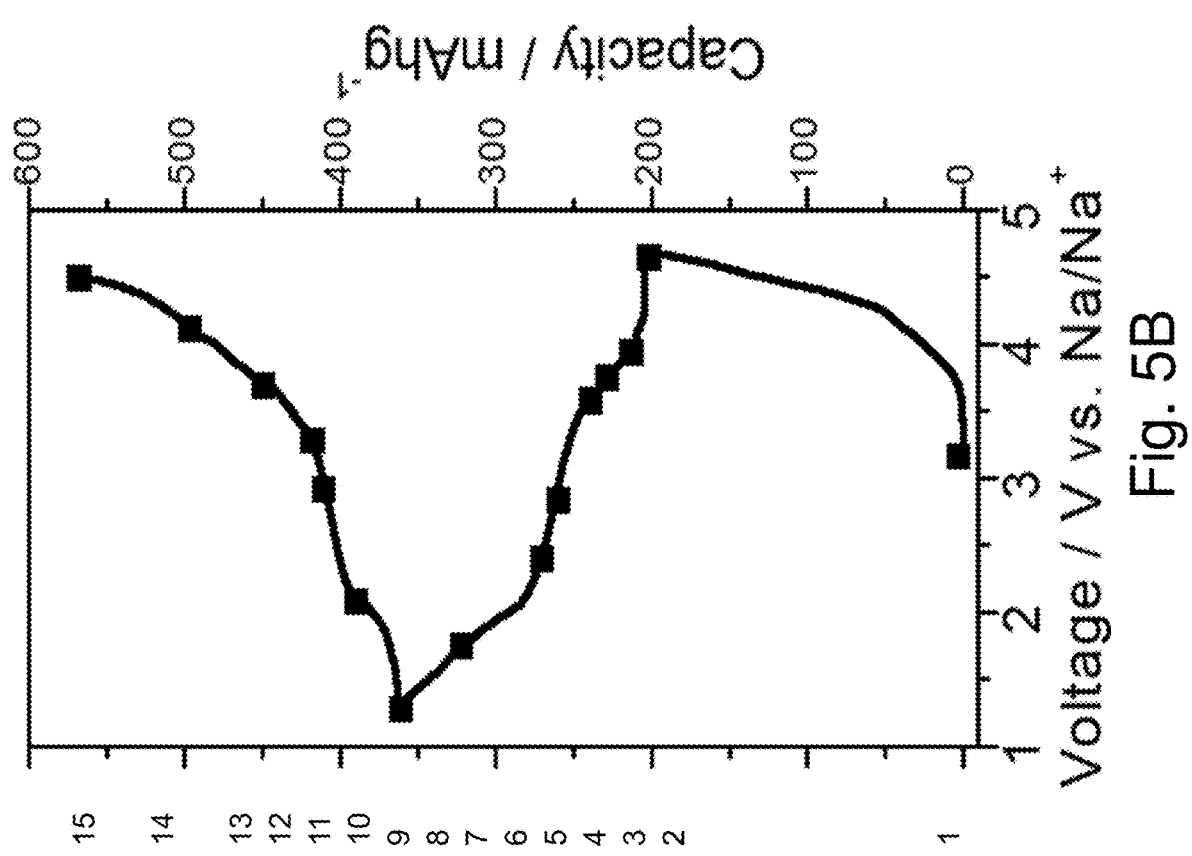
Figure 5C:
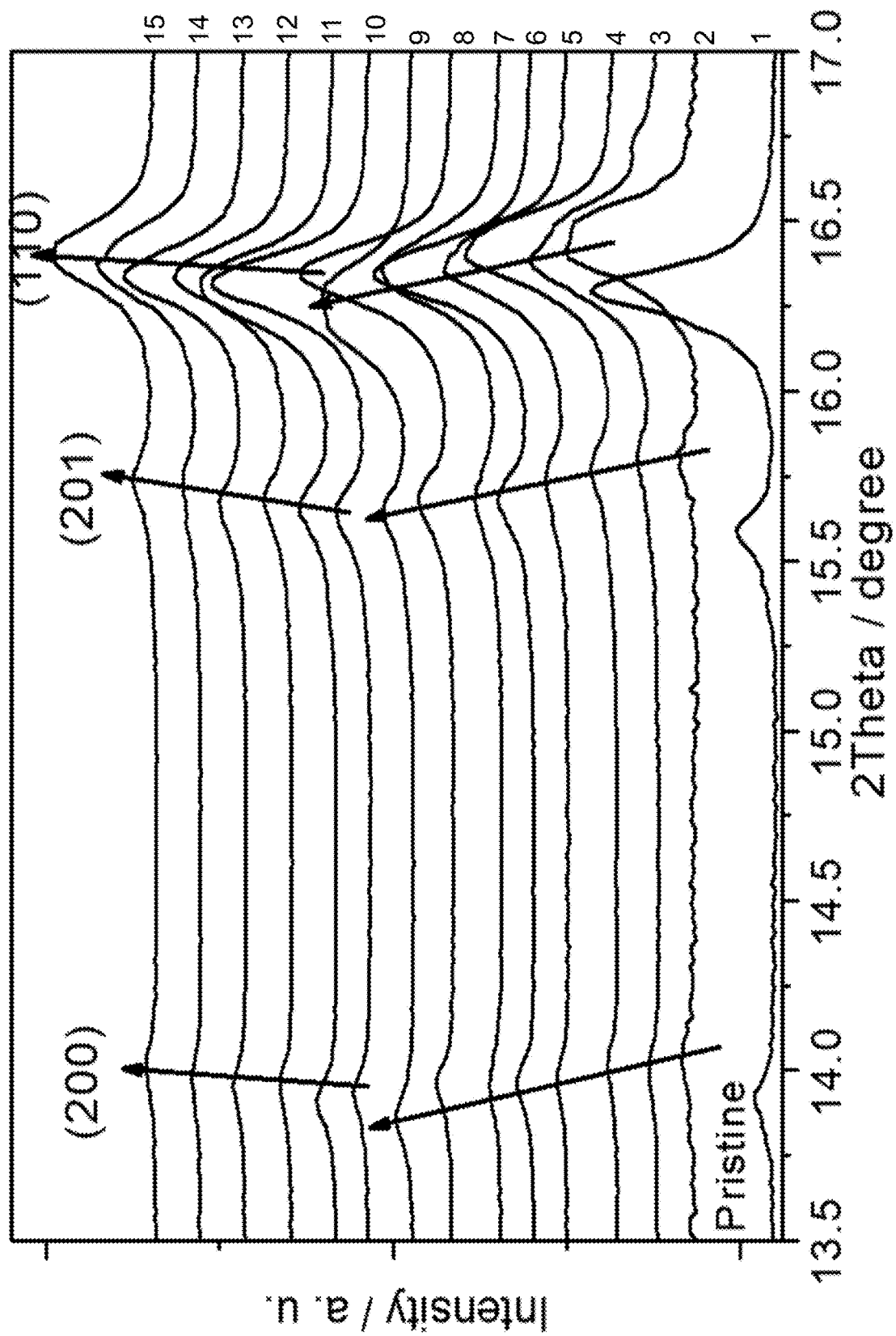
Figure 5D:
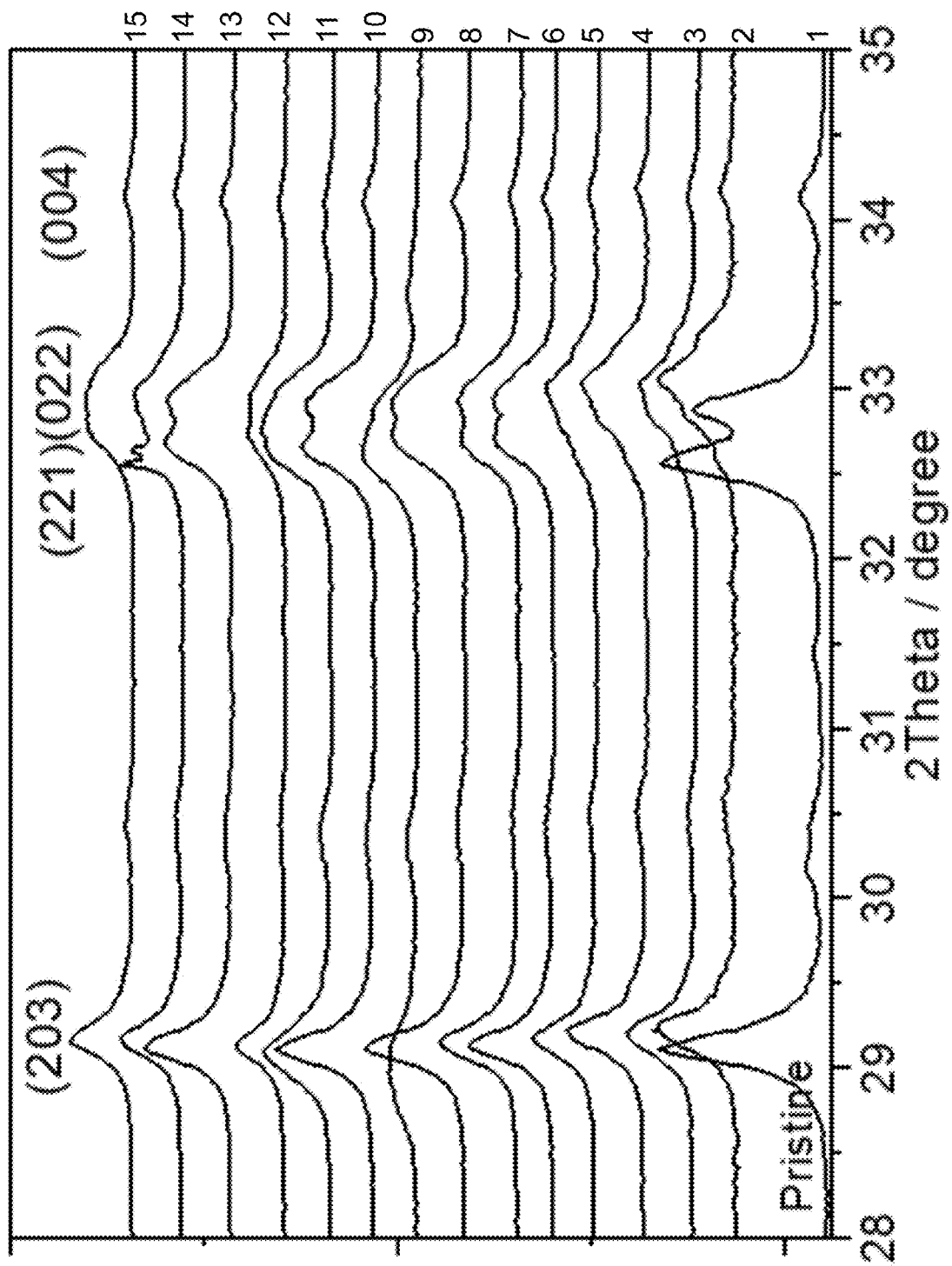
Figure 6A:
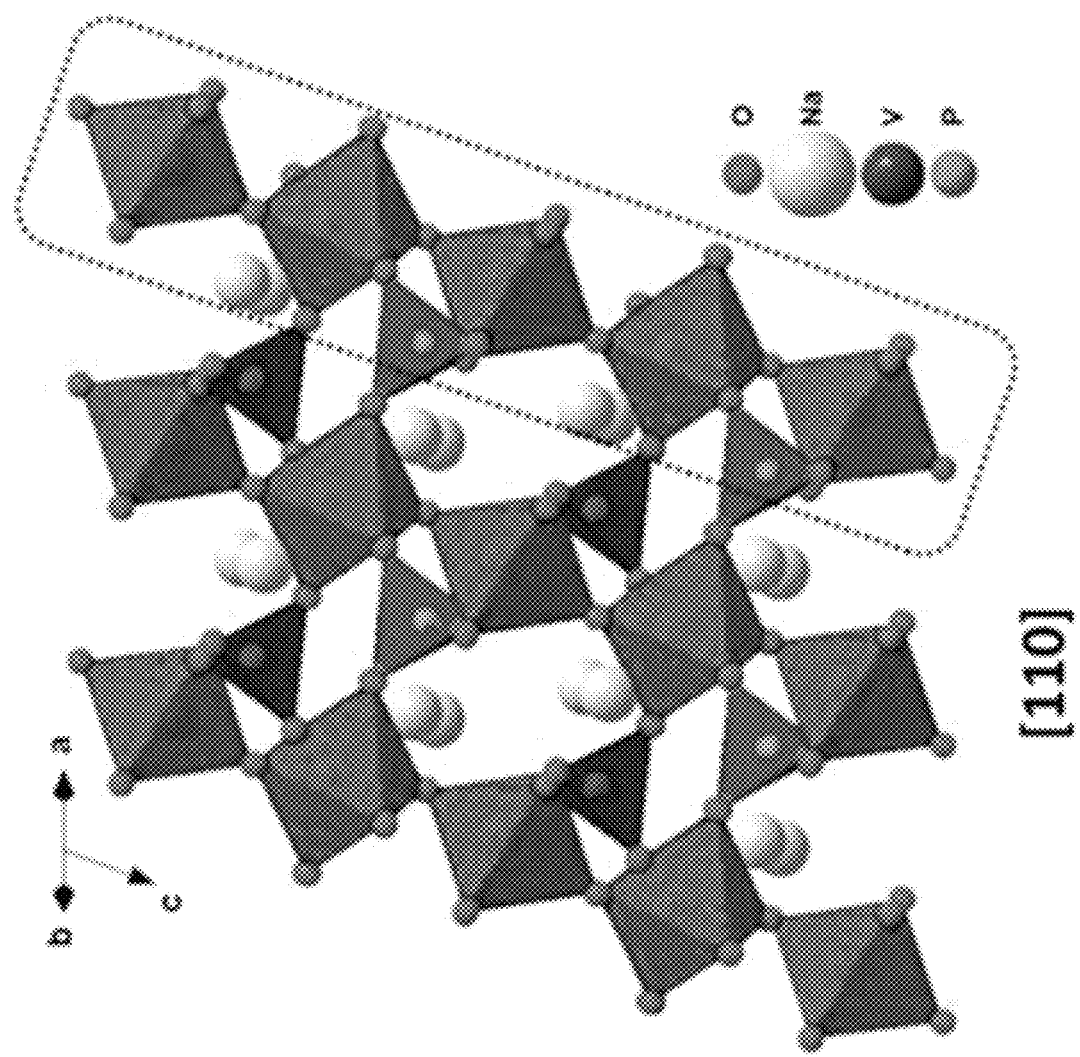
Figure 6B:
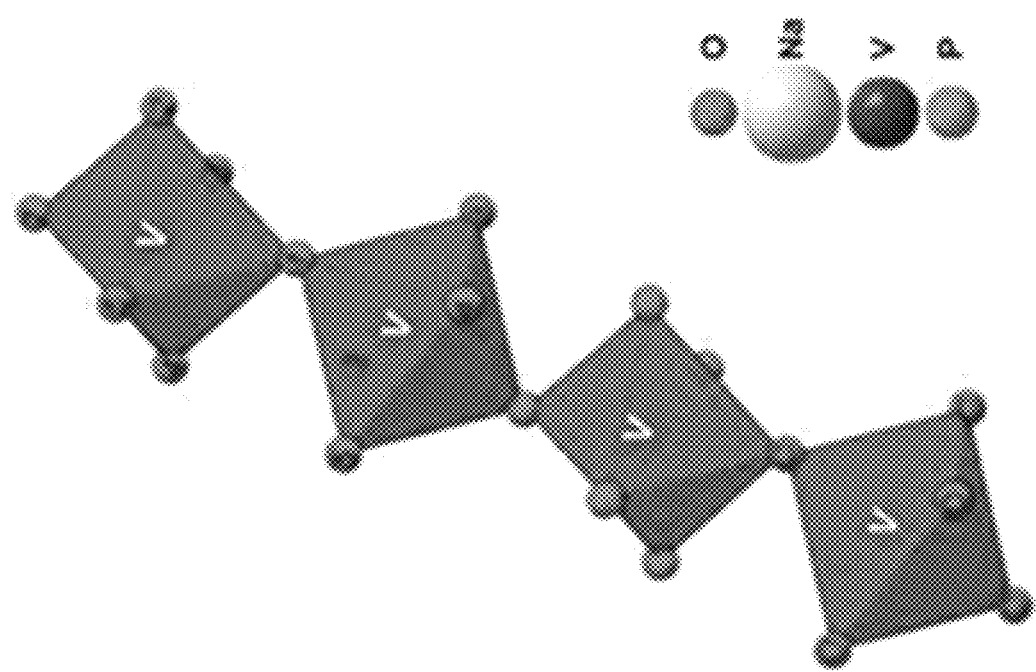
Figure 6D:
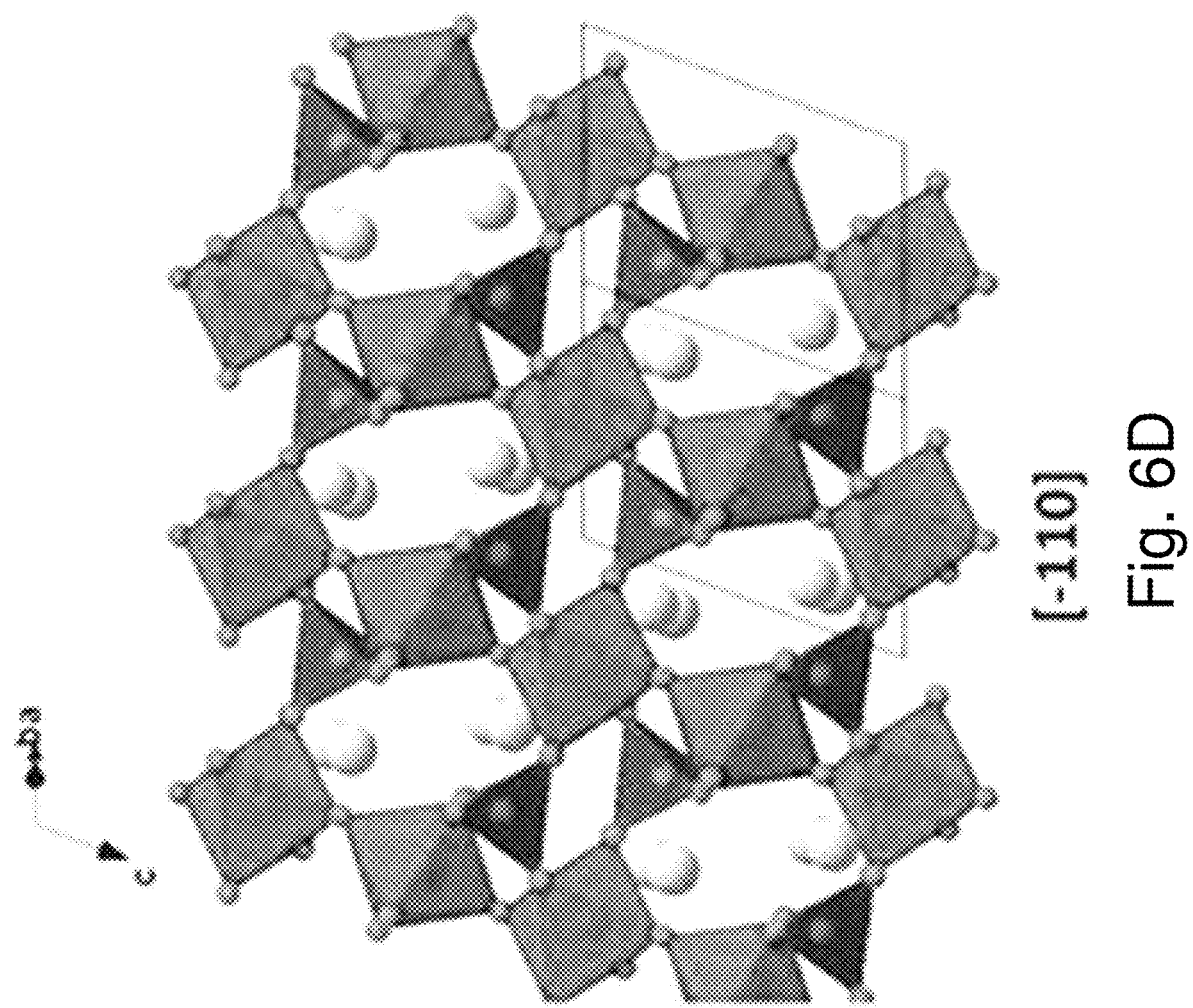
Figure 7A:
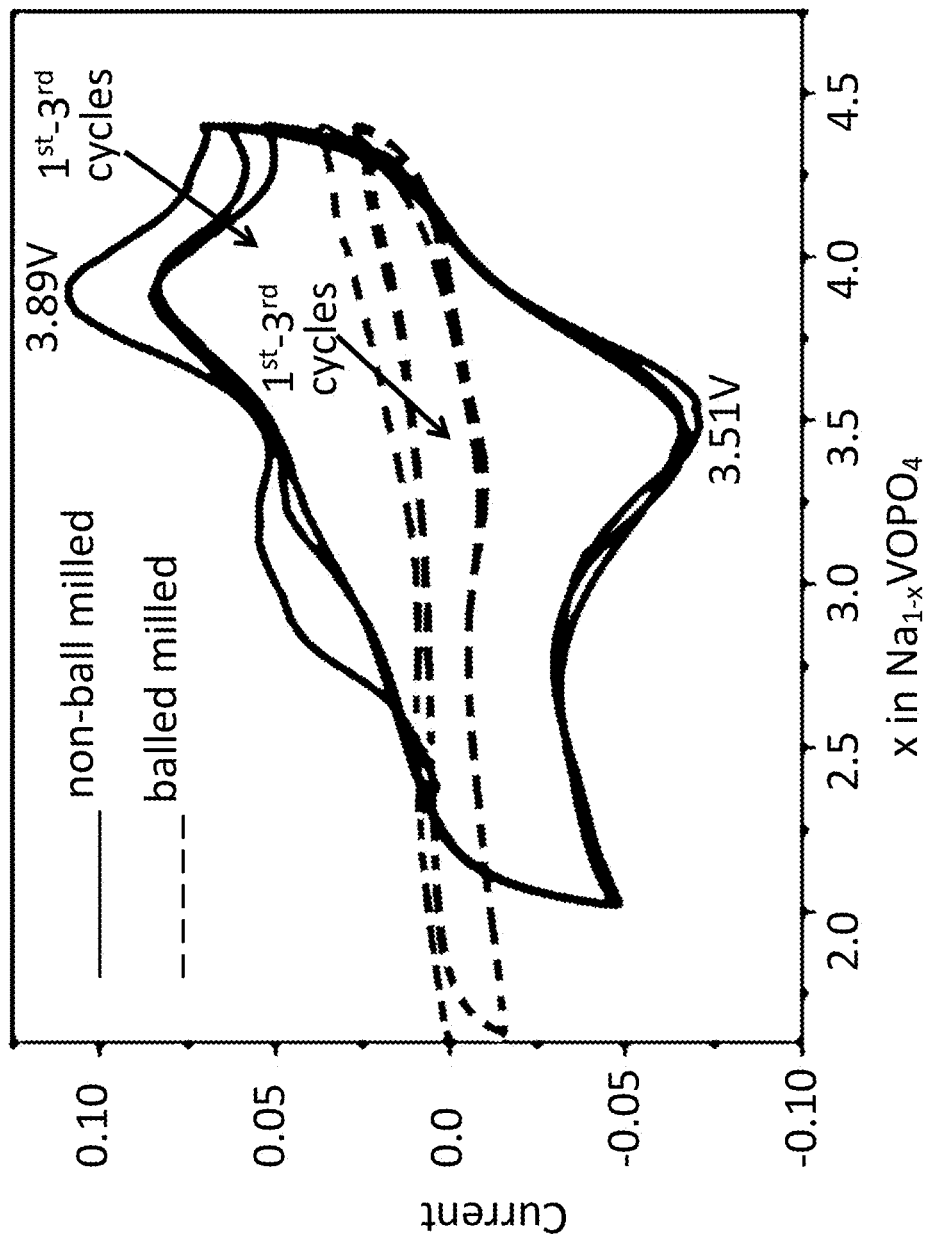
FIGS. 7A-7D show (7A) CV profiles (scan rate at 0.1 mV s−1); (7B) charge-discharge curves (current density of 5 mA g−1) at room temperature of (b) non-ball-milled NaVOPO$_4$; (7C) ball-milled NaVOPO$_4$ and (7D) cycling performance of ball-milled NaVOPO$_4$ at a current density of 10 mA g$^{-1}$.
Figure 7B:
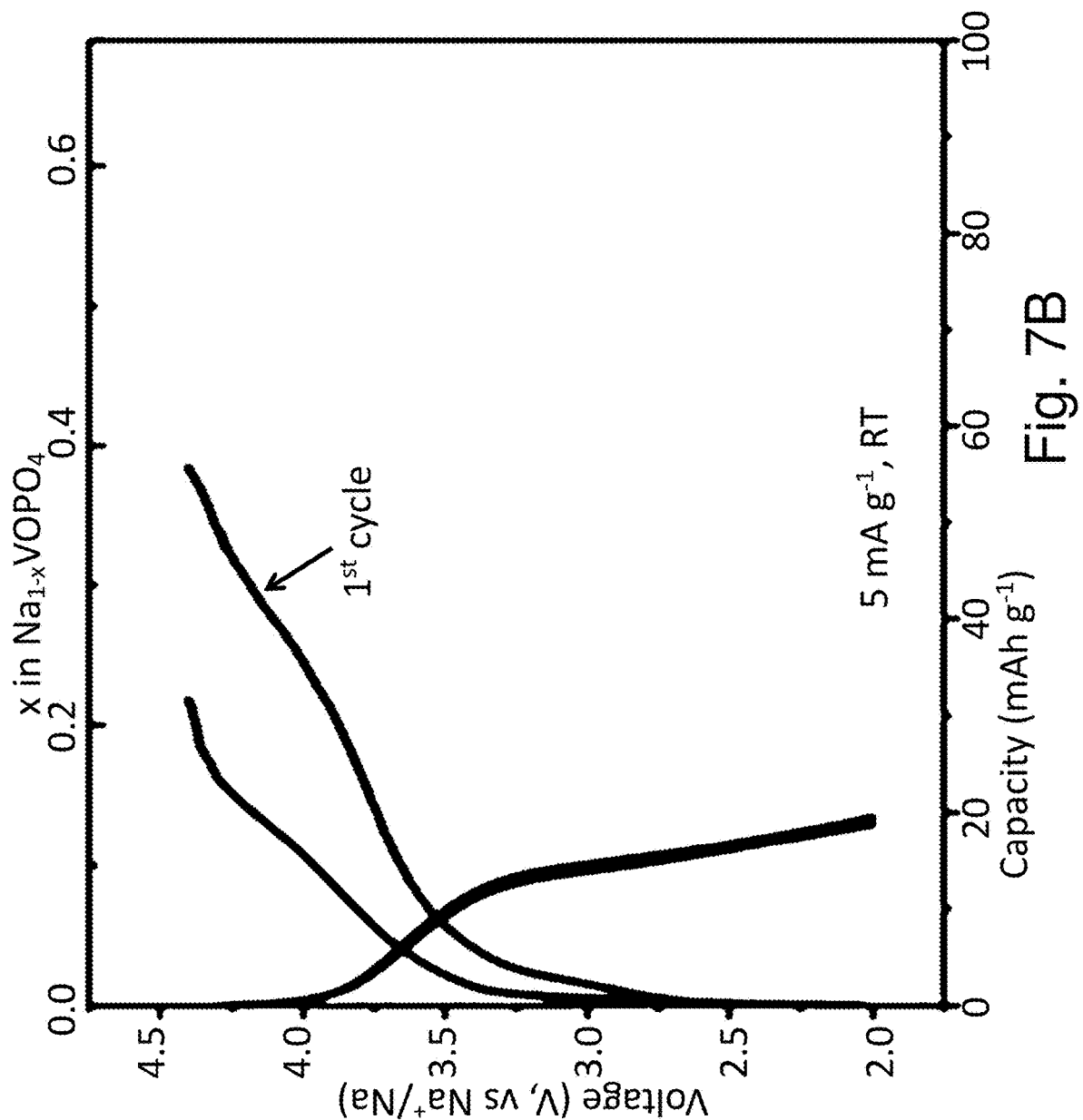
Figure 7C:
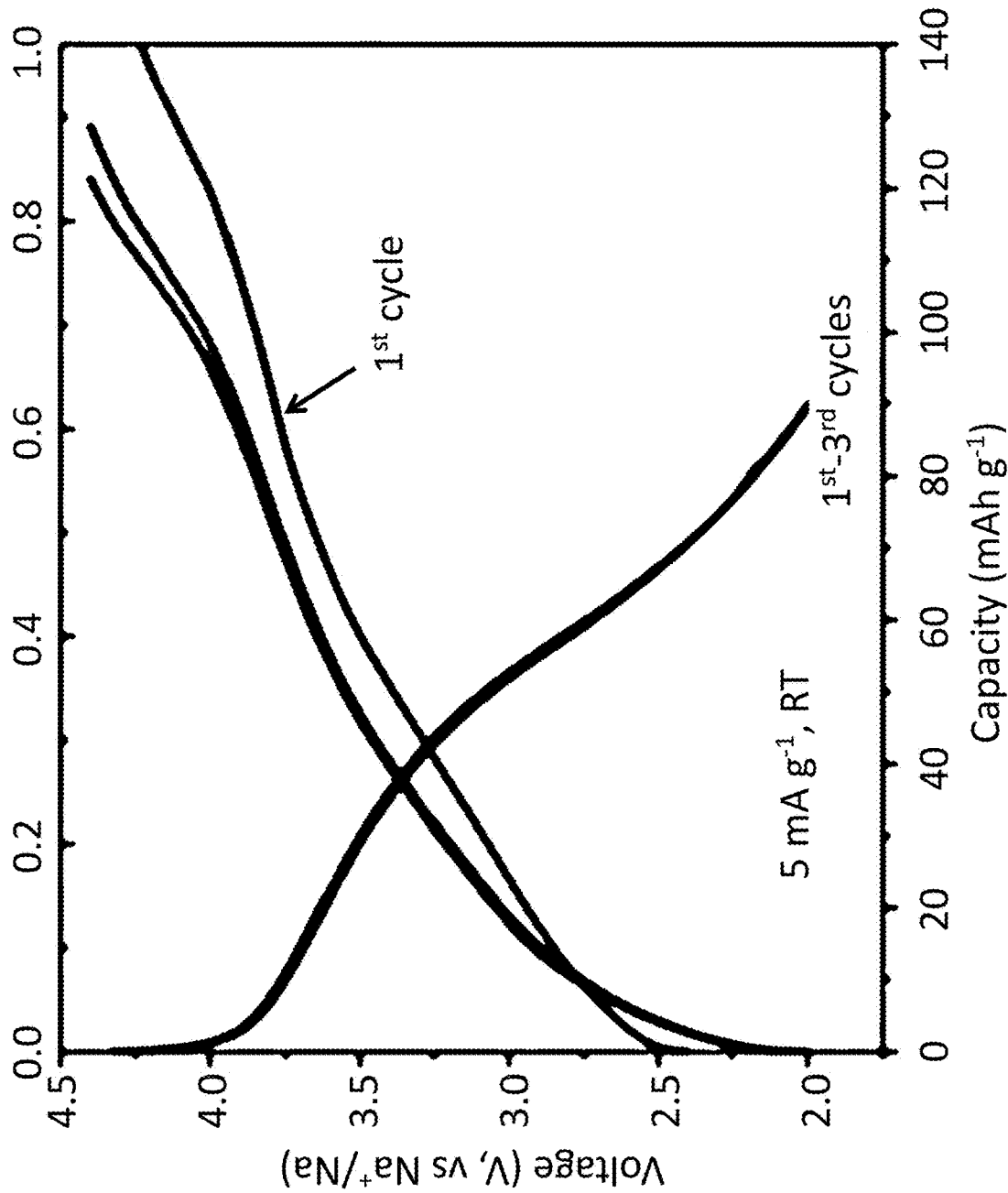
Figure 7D:
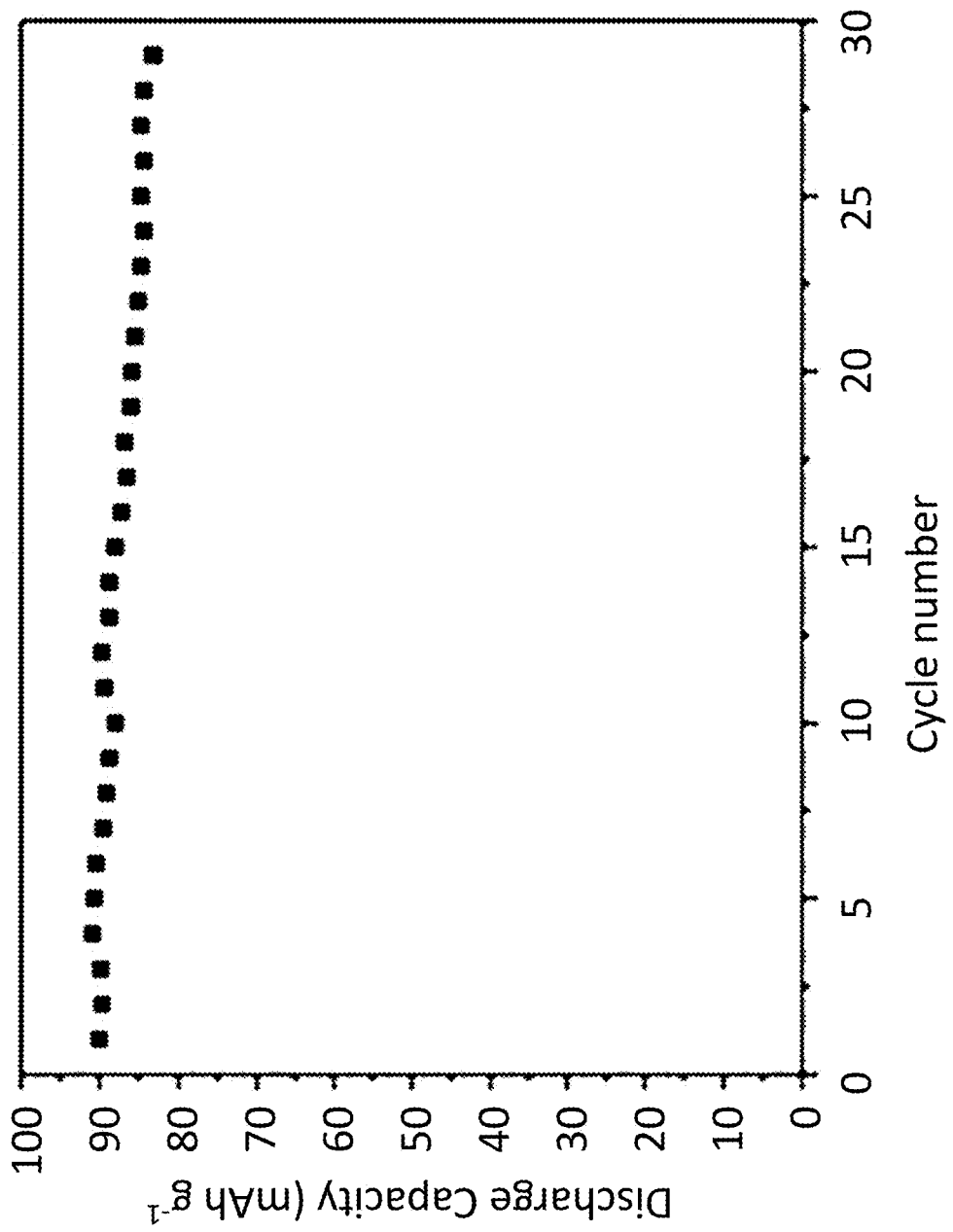

From a thermodynamic point of view, the higher voltage region should be related to the V$^{5+}$/V$^{4+}$ redox couple and the lower voltage region should be related to the V$^{4+}$/V$^{3+}$ redox The reaction kinetics of KVOPO$_4$ cathode was investigated by GITT in FIGS. 4A and 4B. The electrode shows very small hysteresis during the charging in the low voltage region (i.e., V$^{3+}$/V$^{4+}$ transition) and discharging in the high voltage region (i.e., V$^{5+}$/V$^{4+}$ transition). According to the voltage versus time chart in FIG. 4B, the overpotential during these two processes is only ~2.8 mV during discharge and 32 mV during charge, respectively. The small polarization indicated the relatively fast kinetics of electrochemical reaction of the cathode. The overpotential has significantly increased when the electrode was charged into the high voltage region or discharged into the low voltage region, which is expected due to the higher energy barrier for the sodium ion bulk diffusion in the related voltage regions. If all the open circuit voltage point in the GITT curve was linked, the formed OCV curve is a sloping shape within the whole voltage region without any pronounced flat plateau. This sloping OCV curve indicated the solid solution behavior during the sodium ion intercalation/extraction.

The crystallographic evolution of $KVOPO_4$ cathode during charge/discharge was investigated by ex situ XRD. The electrodes were galvanostatically sodiated/desodiated to different cut-off voltages at C/50 and then tested by XRD. The patterns were shown in FIGS. 5A-5D. For all the XRD patterns at different voltage states, there is no addition diffraction peaks observed. The absence of new peaks indicated the absence of additional new phase during the whole voltage window. As shown in the highlighted regions, some of the peak positions (e.g., (200), (201), (110)) displayed continuously shift in one direction during discharging and shifted back during charge. Some of the well-resolved peaks (e.g., (221), (022)) in the pristine material has merged into one broad peak during some states of charge/discharge, indicating they could shift towards different directions. These new peak absence and peaks shift are clear indications of a single-phase reaction mechanism of the electrochemical reaction. Otherwise, emergence and growth of second phase peaks would happen if a two-phase reaction involved.

FIGS. 6A-6D show structural illustrations of the monoclinic $NaVOPO_4$ polymorph consisting of $VO_6$ octahedra (blue), $PO_4$ tetrahedra (dark green) and Na atoms (white). These are comparable to the structural illustrations shown in FIGS. 2A-2D for $KVOPO_4$.

FIGS. 7A-7D show (7A) CV profiles (scan rate at 0.1 mV s−1); (7B) charge-discharge curves (current density of 5 mA g−1) at room temperature of (b) non-ball-milled $NaVOPO_4$; (7C) ball-milled $NaVOPO_4$ and (7D) cycling performance of ball-milled $NaVOPO_4$ at a current density of 10 mA $g^{-1}$. This shows the much lower capacity of the $NaVOPO_4$ as compared to the $KVOPO_4$ material according to the present invention.

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

What is claimed is:

1. A method of forming an electrode, comprising:
   milling a mixture of ammonium metavanadate, ammonium phosphate monobasic, and potassium carbonate;
   solid phase synthesizing $KVOPO_4$ by heating the milled mixture to a reaction temperature;
   milling the $KVOPO_4$ together with conductive particles to form a conductive mixture of fine particles; and
   replacing potassium ions with sodium ions to form $NaVOPO_4$.

2. The method according to claim 1, wherein said heating is at a temperature of between 600° C. and 800° C. for about 10 hours.

3. The method according to claim 1, wherein the conductive particles comprise carbon particles.

4. The method according to claim 1, further comprising adding a binder material selected from one or more of the group consisting of a poly (vinylidene fluoride), a polytetrafluoroethylene, a styrene butadiene rubber, and a polyimide.

5. The method according to claim 1, wherein the $NaVOPO_4$ has a lattice having a crystalline structure having orthorhombic symmetry with space group $Pna2_1$.

6. The method according to claim 1, wherein further comprises an insoluble conductive additive.

7. The method according to claim 1, wherein the conductive particles comprise conductive carbon.

8. The method according to claim 1, further comprising:
   providing a sodium donor anode and a sodium ion transport electrolyte to form a sodium ion battery; and
   operating the sodium ion battery with a discharge voltage curve comprising a first voltage plateau region comprising 3.8 V, and a second voltage plateau region comprising 2 V, the electrode having a capacity of at least C=133 $mAhg^{-1}$.

9. The method according to claim 1, wherein the conductive mixture, after replacement of the potassium ions with sodium ions comprises $NaVOPO_4$ particles having particle size of 200 nm and conductive particles having a particle size of 2 μm.

10. The method according to claim 1, further comprising a poly(vinylidene fluoride) binder.

11. The method according to claim 1, wherein the electrode has a capacity of at least C=133 $mAhg^{-1}$.

12. The method according to claim 1, wherein the $NaVOPO_4$ comprises a lattice having a volume greater than 90 $Å^3$ per $VOPO_4$.

13. A method of forming an $NaVOPO_4$ electrode, comprising a $VOPO_4$ lattice,
   the $VOPO_4$ lattice having a volume greater than 90 $Å^3$ per $VOPO_4$; and
   a portion of the $VOPO_4$ lattice having two sodium ions per $VOPO_4$,
   the method comprising:
   forming a mixture of ammonium metavanadate, ammonium phosphate monobasic, and potassium carbonate;
   synthesizing $KVOPO_4$ in a solid phase by heating the mixture;
   combining the $KVOPO_4$ with conductive particles to form a conductive mixture; and
   replacing at least a portion of potassium ions with sodium ions to form a $NaVOPO_4$.

14. The method according to claim 13, wherein the $NaVOPO_4$ has orthorhombic symmetry has space group $Pna2_1$.

15. The method according to claim 13, wherein the $KVOPO_4$ is milled together with the conductive particles comprising carbon particles, before the replacement of at least a portion of potassium with sodium.

16. The method according to claim 13, further comprising forming a sodium ion battery by providing a sodium battery anode and a sodium ion transport electrolyte in combination with the electrode, the sodium ion battery having a capacity of at least C=133 $mAhg^{-1}$, and a discharge voltage curve comprising a first voltage plateau region comprising 3.8 V, and a second voltage plateau region comprising 2 V.

\* \* \* \* \*